United States Patent
Ohji

(10) Patent No.: US 11,067,146 B2
(45) Date of Patent: Jul. 20, 2021

(54) COMPOSITE VIBRATION-DAMPING BODY AND METAL-SPRING-EQUIPPED COMPOSITE VIBRATION-DAMPING BODY USING THE SAME

(71) Applicant: SUMITOMO RIKO COMPANY LIMITED, Komaki (JP)

(72) Inventor: Akira Ohji, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 122 days.

(21) Appl. No.: 16/536,987

(22) Filed: Aug. 9, 2019

(65) Prior Publication Data

US 2019/0360547 A1 Nov. 28, 2019

Related U.S. Application Data

(63) Continuation of application No. PCT/JP2018/030129, filed on Aug. 10, 2018.

(30) Foreign Application Priority Data

Nov. 28, 2017 (JP) .............................. JP2017-227458

(51) Int. Cl.
 *F16F 3/12* (2006.01)
 *F16F 3/093* (2006.01)
 *E05F 5/02* (2006.01)

(52) U.S. Cl.
 CPC .............. *F16F 3/0935* (2013.01); *F16F 3/12* (2013.01); *E05F 5/025* (2013.01); *E05Y 2201/224* (2013.01); *E05Y 2900/531* (2013.01)

(58) Field of Classification Search
 CPC .. F16F 3/0935; F16F 3/12; F16F 3/093; F16F 15/08; F16F 1/36; F16F 1/37
 (Continued)

(56) References Cited

U.S. PATENT DOCUMENTS 3,323,786 A * 6/1967 Boschi .................. F16F 13/002
267/292
4,002,315 A * 1/1977 Van Goubergen ...... F16F 1/376
248/633

(Continued)

FOREIGN PATENT DOCUMENTS

CN 204755697 U 11/2015
JP S49-14676 B1 4/1974
(Continued)

OTHER PUBLICATIONS

Nov. 2, 2020 Office Action issued in Chinese Patent Application No. 201880038618.3.
(Continued)

*Primary Examiner* — Melanie Torres Williams
(74) *Attorney, Agent, or Firm* — Oliff PLC

(57) ABSTRACT

A composite vibration-damping body including a first elastic body and a second elastic body overlapped with each other, wherein the first elastic body is formed of a material having higher attenuation than that of the second elastic body, the first elastic body includes a recessed part opening onto a surface of the first elastic body, and the recessed part forms a gap, and a strain concentration part configured to be subjected to an increased strain during load input is set to a wall of the gap of the of the first elastic body.

10 Claims, 12 Drawing Sheets
(3 of 12 Drawing Sheet(s) Filed in Color)

(58) Field of Classification Search
USPC .................................................. 267/152, 153
See application file for complete search history.

(56) References Cited

U.S. PATENT DOCUMENTS

| | | | | | |
|---|---|---|---|---|---|
| 4,790,521 | A | * | 12/1988 | Ide | F16F 3/08 |
| | | | | | 180/300 |
| 5,017,328 | A | * | 5/1991 | Mazurek | F16F 1/3713 |
| | | | | | 248/560 |
| 5,131,195 | A | * | 7/1992 | Bellavista | E04H 9/021 |
| | | | | | 52/167.1 |
| 5,330,165 | A | * | 7/1994 | van Goubergen | F16F 1/374 |
| | | | | | 267/141 |
| 5,467,970 | A | * | 11/1995 | Ratu | B60G 7/04 |
| | | | | | 267/152 |
| 5,568,705 | A | * | 10/1996 | Bellavista | E04H 9/021 |
| | | | | | 52/167.1 |
| 8,720,921 | B1 | * | 5/2014 | Lamberti | F16F 3/0873 |
| | | | | | 280/124.164 |
| 9,494,211 | B2 | * | 11/2016 | Seko | F16F 15/08 |
| 9,982,441 | B2 | * | 5/2018 | Gleeson | E04F 15/20 |
| 2008/0290572 | A1 | * | 11/2008 | Desprez | F16F 1/126 |
| | | | | | 267/178 |

FOREIGN PATENT DOCUMENTS

| | | |
|---|---|---|
| JP | S59-40645 U | 3/1984 |
| JP | S62-177941 U | 11/1987 |
| JP | H04-153 B2 | 1/1992 |
| JP | H08-152035 A | 6/1996 |
| JP | 2003-194148 A | 7/2003 |
| JP | 2016-125528 A | 7/2016 |

OTHER PUBLICATIONS

Nov. 6, 2018 Search Report issued in International Patent Application No. PCT/JP2018/030129.
Sep. 1, 2020 Office Action issued in Japanese Patent Application No. 2019-557012.

* cited by examiner

COMPOSITE VIBRATION-DAMPING BODY AND METAL-SPRING-EQUIPPED COMPOSITE VIBRATION-DAMPING BODY USING THE SAME

INCORPORATED BY REFERENCE

This application is a Continuation of International Application No. PCT/JP2018/030129 filed Aug. 10, 2018, which claims priority under 35 U.S.C. §§ 119(a) and 365 of Japanese Patent Application No. 2017-227458 filed on Nov. 28, 2017, the disclosures of which are expressly incorporated herein by reference in their entireties.

BACKGROUND OF THE INVENTION

1. Field of the Invention

The present invention relates to, for example, a composite vibration-damping body used for holding a constituent component of a vibration transmission system in a vibration damping connection state, or limiting the amount of relative displacement between constituent components of a vibration transmission system. The present invention also relates to a metal-spring-equipped composite vibration-damping body using the same.

2. Description of the Related Art

Conventionally, as a vibration damping body adapted for use as, for example, a door stopper positioning a door of a vehicle with respect to a body frame, a stopper mechanism of a vibration damping device such as an engine mount, and the like, there has been proposed a composite vibration-damping body having a structure in which a plurality of elastic bodies are overlapped with each other. Specifically, like a stopper shown in Japanese Unexamined Patent Publication No. JP-A-2016-125528, the composite vibration-damping body has a structure in which an exterior body and an interior body formed of rubber-like elastic body are overlapped with each other. By differentiating the hardness of the exterior body and the interior body from each other, it is possible to obtain a large degree of freedom in adjusting the spring characteristics.

Meanwhile, attenuating action exhibited by deformation of the elastic body during load input is greatly obtained by a large strain being generated by the elastic body.

However, with the stopper of JP-A-2016-125528, during the load input, the strain is dispersed by the exterior body and the interior body entirely deforming, whereby the exhibited attenuating action is relatively small. Thus, the vibration damping ability may be insufficient.

SUMMARY OF THE INVENTION

The present invention has been developed in view of the above-described matters as the background, and it is an object of the present invention to provide a composite vibration-damping body with a novel structure which is able to realize more excellent vibration damping performance, and to provide a metal-spring-equipped composite vibration-damping body using the same.

The above and/or optional objects of this invention may be attained according to at least one of the following preferred embodiments of the invention. The following preferred embodiments and/or elements employed in each preferred embodiment of the invention may be adopted at any possible optional combinations.

Specifically, a first preferred embodiment of the present invention provides a composite vibration-damping body comprising a first elastic body and a second elastic body overlapped with each other, wherein the first elastic body is formed of a material having higher attenuation than that of the second elastic body, the first elastic body includes a recessed part opening onto a surface of the first elastic body, and the recessed part forms a gap, and a strain concentration part configured to be subjected to an increased strain during load input is set to a wall of the gap of the of the first elastic body.

According to the composite vibration-damping body structured following the first preferred embodiment, the first elastic body is formed of a high attenuation material, and the strain due to load input is generated concentratedly in the strain concentration part of the first elastic body set by the recessed part. This makes it possible to obtain large attenuating action, thereby realizing excellent vibration damping performance.

Moreover, the strain concentration part is set to the wall of the gap provided by the recessed part. Accordingly, the strain of the first elastic body in the strain concentration part is largely generated without being limited by the second elastic body inserted in the recessed part or the like, thereby efficiently obtaining the attenuating action in the strain concentration part.

A second preferred embodiment of the present invention provides the composite vibration-damping body according to the first preferred embodiment, wherein the recessed part of the first elastic body has a groove shape.

According to the second preferred embodiment, since the recessed part has a groove shape, the gap formed by the recessed part and the strain concentration part set to the wall of the gap both can be largely obtained in the lengthwise direction of the recessed part. This makes it possible to more advantageously obtain the attenuating action owing to the strain of the strain concentration part in the first elastic body, so as to realize excellent vibration damping performance.

A third preferred embodiment of the present invention provides the composite vibration-damping body according to the first or second preferred embodiment, wherein the recessed part of the first elastic body opens to a lateral side with respect to a direction of load input.

According to the third preferred embodiment, during load input, the first elastic body deforms so as to narrow the opening of the recessed part, thereby making it possible to concentrate the strain on the inner face of the recessed part. Thus, attenuating action can be effectively obtained.

A fourth preferred embodiment of the present invention provides the composite vibration-damping body according to any one of the first through third preferred embodiments, wherein the first elastic body and the second elastic body are overlapped in a direction of load input.

According to the fourth preferred embodiment, for example, by forming the second elastic body of a material which is excellent in shock absorbing ability or durability with respect the first elastic body, the composite vibration-damping body is able to concomitantly obtain shock absorbing ability, durability, or the like owing to the second elastic body in addition to the excellent vibration damping ability owing to the attenuating action of the first elastic body.

A fifth preferred embodiment of the present invention provides the composite vibration-damping body according to the fourth preferred embodiment, wherein the first elastic body includes a protruding part provided on an overlapped face with the second elastic body and protruding toward the second elastic body, and the recessed part is formed on an outer circumference of the protruding part.

According to the fifth preferred embodiment, the protruding part is compressed by load input, and the protruding part elastically deforms so as to expand radially outward according to a Poisson ratio, thereby obtaining a large strain in the strain concentration part formed on the outer circumference of the protruding part.

A sixth preferred embodiment of the present invention provides the composite vibration-damping body according to the fifth preferred embodiment, wherein a protruding distal end face of the protruding part is in contact with the second elastic body, and the first elastic body and the second elastic body are in contact with each other in a direction of protrusion of the protruding part at a position away from the protruding part to a radial outside.

According to the sixth preferred embodiment, since the first elastic body and the second elastic body are in contact not only at the protruding distal end face of the protruding part but also at the position away from the protruding part to the radial outside, excellent load bearing capability or the like can be realized.

A seventh preferred embodiment of the present invention provides the composite vibration-damping body according to any one of the first through sixth preferred embodiments, wherein the recessed part opens onto an overlapped face of the first elastic body with the second elastic body, the second elastic body includes a convex part inserted in the recessed part, the convex part is partially in contact with an inner face of the recessed part, and the gap is formed between the convex part and the inner face of the recessed part.

According to the seventh preferred embodiment, since the convex part is inserted in the recessed part and is partially in contact therewith, for example, it is also possible to connect the first elastic body and the second elastic body by engagement of the convex part and the recessed part. Furthermore, when the first elastic body elastically deforms due to load input, the convex part inserted in the recessed part is clasped by the first elastic body so as to elastically deform, thereby making it also possible to obtain further attenuating action. Note that the gap is formed between the convex part and the inner face of the recessed part. Thus, deformation of the strain concentration part of the first elastic body and deformation of the convex part of the second elastic body will effectively take place without being mutually restrained.

An eighth preferred embodiment of the present invention provides the composite vibration-damping body according to any one of the first through seventh preferred embodiments, wherein the second elastic body is formed of a material having a smaller compression set than that of the first elastic body.

According to the eighth preferred embodiment, the composite vibration-damping body is provided with the first elastic body formed of a high attenuation material and the second elastic body which is less prone to undergo permanent set, whereby it is possible to realize excellent vibration damping ability, shock absorbing ability, positioning ability, or the like. Here, the compression set refers to the amount of strain remaining due to static compressive loading history under the same condition.

A ninth preferred embodiment of the present invention provides a metal-spring-equipped composite vibration-damping body comprising: the composite vibration-damping body according to any one of the first through eighth preferred embodiments; and a metal spring provided to the composite vibration-damping body in series in a direction of load input.

According to the metal-spring-equipped composite vibration-damping body structured following the ninth preferred embodiment, when a static load acts over a long period, for example, by the metal spring elastically deforming, permanent set of the composite vibration-damping body will be prevented. Moreover, the metal spring is less likely to undergo time-dependent permanent set in comparison with an elastic body such as a rubber or an elastomer, thereby avoiding change in size of the metal-spring-equipped composite vibration-damping body due to plastic deformation of the metal spring or the like.

A tenth preferred embodiment of the present invention provides the composite vibration-damping body according to the ninth preferred embodiment, wherein the metal spring includes an attachment part to a component to be damped.

According to the tenth preferred embodiment, the composite vibration-damping body can be attached to the component to be damped by the metal spring. This makes it possible to reduce the number of parts in comparison with the case where a component for attachment is provided separately from the metal spring, as well as to achieve a simple structure.

An eleventh preferred embodiment of the present invention provides the composite vibration-damping body according to the ninth or tenth preferred embodiment, wherein the metal spring comprises a plate spring which is folded at a bent part.

According to the eleventh preferred embodiment, by adjusting the angle formed by the opposite side portions of the bent part of the metal spring, the orientation of the composite vibration-damping body can easily be adjusted. In particular, in the case of employing the metal-spring-equipped composite vibration-damping body as a stopper of a vehicle-use door that can be opened and closed with respect to a body frame by a hinge, the position of the hinge which is the center of displacement of the vehicle-use door and the position of the center of deformation of the metal spring are different from each other. Thus, contact embodiment of the vehicle-use door with respect to the composite vibration-damping body changes as the amount of displacement of the vehicle-use door increases, thereby making it also possible to further concentrate the strain on the strain concentration part of the first elastic body or the like.

According to the present invention, the first elastic body is formed of a material having higher attenuation than that of the second elastic body, and strain due to load input is generated concentratedly in the strain concentration part set by the recessed part. Accordingly, excellent attenuating action will be exhibited in the strain concentration part of the first elastic body, thereby advantageously obtaining vibration damping effect owing to energy attenuation. Moreover, since the strain concentration part is set to the wall of the gap formed by the recessed part, the deformation of the first elastic body in the strain concentration part will greatly take place without being limited by the second elastic body, thereby more efficiently obtaining the attenuating action.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing and/or other objects, features and advantages of the invention will become more apparent from the following description of practical embodiments with reference to the accompanying drawings in which like reference numerals designate like elements and wherein.

DETAILED DESCRIPTION OF EMBODIMENTS

Hereinafter, practical embodiments of the present invention will be described in reference to the drawings.

Figure 1:
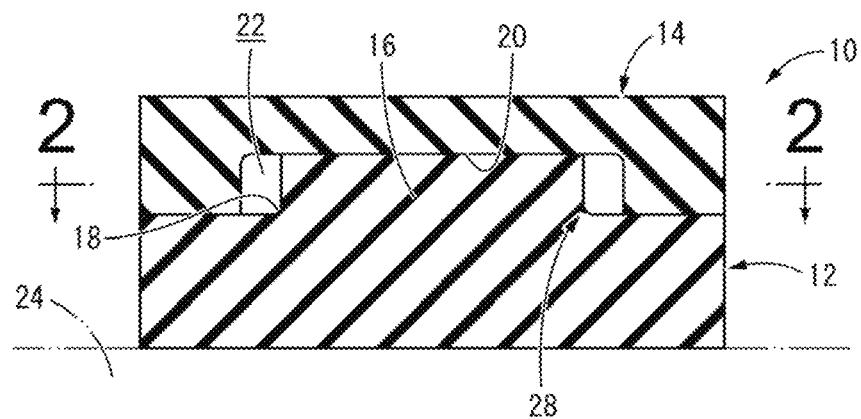
FIG. 1 is a cross-sectional view showing a composite vibration-damping body in the form of a door stopper as a first practical embodiment of the present invention, taken along line 1-1 of FIG. 2.
Figure 2:
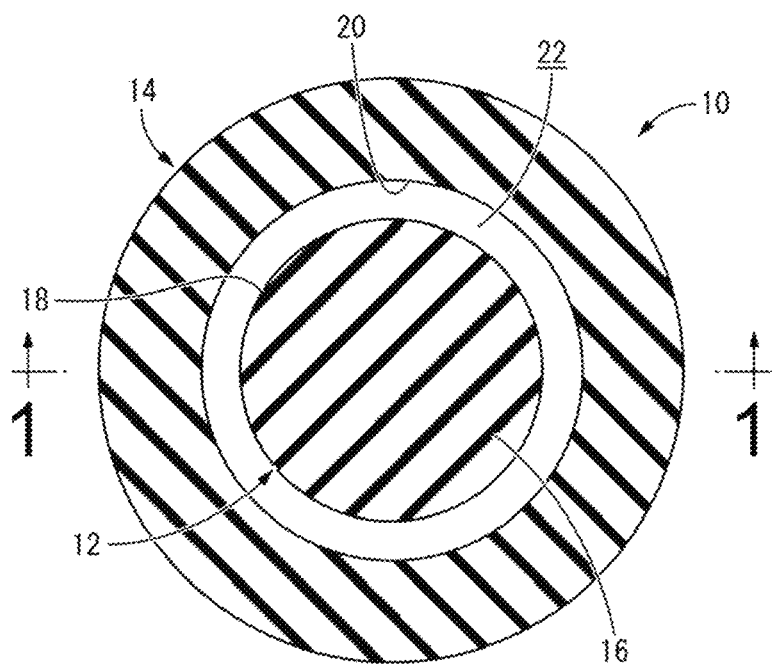
FIG. 2 is a cross-sectional view taken along line 2-2 of FIG. 1.

FIGS. 1 and 2 depict a door stopper 10 for a vehicle as a first practical embodiment of a composite vibration-damping body constructed according to the present invention. The door stopper 10 has a structure in which a first elastic body 12 and a second elastic body 14 are overlapped in series in the axial direction. In the description of the present practical embodiment, as a general rule, the vertical direction refers to the vertical direction in FIG. 1, which is the axial direction of the door stopper 10.

Described more specifically, the first elastic body 12 has a generally cylindrical shape overall, and includes a small-diameter, cylindrical protruding part 16 that is integrally formed at the diametrically central portion and protrudes upward. Furthermore, the first elastic body 12 includes a recessed part 18 that opens onto the surface on the outer circumference of the proximal end of the protruding part 16. The recessed part 18 is formed such that the outer circumferential surface of the protruding part 16 and the upper face of the first elastic body 12 on the radial outside of the protruding part 16 serve as its wall surface. In the present practical embodiment, the recessed part 18 has a groove shape that opens upward and radially outward to the lateral side and extends continuously about the entire circumference in the circumferential direction.

The first elastic body 12 is formed of rubber, thermoplastic resin elastomer, or the like. Moreover, the first elastic body 12 is formed of a material having higher attenuation that is superior in energy attenuation performance to the second elastic body 14. In preferred practice, with respect to the first elastic body 12, the loss tangent (tan δ) is 0.3 or greater in the case where a vibration having a frequency of 25 Hz and an amplitude of ±0.5 mm is input under room temperature conditions, and the first elastic body 12 exhibits excellent energy attenuation performance based on the viscosity that converts a kinetic energy into a thermal energy. The dynamic properties of the first elastic body 12 including the loss tangent can be specified on the basis of, for example, "Rubber, vulcanized or thermoplastic —Determination of dynamic properties—" of JIS K6394.

Furthermore, while the forming material of the first elastic body 12 is not limited in particular, for example, styrene-type rubber or butyl-type rubber is adopted. For example, styrene butadiene rubber (SBR), isobutylene isoprene rubber (IIR), ethylene-propylene rubber (EPDM) or the like is preferably adopted. Besides, the forming material of the first elastic body 12 may be a thermoplastic elastomer. For example, SBR or the like whose polymerization method is different from that of synthetic rubber can suitably be adopted.

The second elastic body 14 has a generally cylindrical shape overall, and includes a generally circular depressed part 20 that opens downward from the diametrically central portion and protrudes upward. The depressed part 20 is larger in diameter than the protruding part 16 of the first elastic body 12, and preferably, the depth dimension of the depressed part 20 is roughly equal to or slightly smaller than the protruding height dimension of the protruding part 16.

The second elastic body 14 is formed of rubber, thermoplastic resin elastomer, or the like, and is preferably formed of a material having a smaller compression set than that of the first elastic body 12. Moreover, it is desirable that the second elastic body 14 have a compression set of 25% or smaller when continuously compressed in the vertical direction under a temperature condition of 85° C. for 70 hours. The method of measuring the compression set of the second elastic body 14 is pursuant to "Rubber, vulcanized or thermoplastic —Determination of compression set at ambient, elevated or low temperatures—" defined in ISO 815 and JIS K6262 based thereon.

Furthermore, while the forming material of the second elastic body 14 is not limited in particular, for example, natural rubber (NR) or butadiene-type rubber (BR or the like) is preferably used. Besides, as the forming material of the second elastic body 14, acrylonitrile-butadiene rubber (NBR), ethylene-propylene rubber (EPM, EPDM), or the like may also be suitably adopted.

The first elastic body 12 and the second elastic body 14 are arranged in series in the axial direction, which is the direction of load input to be described later, and are bonded to each other by, for example, an adhesive being applied to the overlapped faces. Additionally, the diameter of the first elastic body 12 and the diameter of the second elastic body 14 are roughly equal, and in the present practical embodiment, the first elastic body 12 is thicker in the axial direction than the second elastic body 14.

The door stopper 10 according to the present practical embodiment is configured such that during input of a load in the axial direction which is assumed when used in a state described later, the amounts of deformation of the first elastic body 12 and the second elastic body 14 arranged in series in the axial direction are roughly equal to each other. Besides, in the door stopper 10 of the present practical embodiment, as shown in FIG. 1, the first elastic body 12 is thicker than the second elastic body 14, and in particular, the differential in thickness is made large between the formation portion of the protruding part 16 in the first elastic body 12 and the floor portion of the depressed part 20 in the second elastic body 14. Therefore, the first elastic body 12 is formed of a hard material having a larger spring constant than that of the second elastic body 14. The hardness of the first elastic body 12 and the hardness of the second elastic body 14 can be specified based on, for example, "Rubber, vulcanized or thermoplastic —Determination of hardness—" defined in JIS K6253-2.

Moreover, the protruding part 16 of the first elastic body 12 protrudes on the overlapped face with the second elastic body 14, and the depressed part 20 of the second elastic body 14 opens onto the overlapped face with the first elastic body 12. The protruding part 16 of the first elastic body 12 is inserted in the depressed part 20 of the second elastic body 14. In the present practical embodiment, the protruding distal end face of the protruding part 16 is in contact with the upper floor face of the depressed part 20, and the protruding distal end face of the protruding part 16 is fixed to the upper floor face of the depressed part 20.

Furthermore, since the diameter of the protruding part 16 is smaller than that of the depressed part 20, the outer circumferential surface of the protruding part 16 and the inner circumferential surface of the depressed part 20 are remote from each other in the radial direction. With this arrangement, the recessed part 18 is not filled with the second elastic body 14, so that a gap 22 is formed by the recessed part 18 between the first elastic body 12 and the second elastic body 14. At least a part of the wall of the gap 22 is constituted by the wall of the recessed part 18, and the gap 22 includes the recessed part 18. In the present practical embodiment, the gap 22 has an annular shape which is continuous about the entire circumference with a generally constant rectangular cross section, so as to be a closed space isolated from the outside.

In the present practical embodiment, the upper face of the first elastic body 12 on the radial outside of the protruding part 16 and the lower face of the second elastic body 14 on the radial outside of the opening of the depressed part 20 are overlapped in a state of contact in the vertical direction and fixed to each other at the position away from the protruding part 16 by the gap 22. As will be appreciated from the above, the protruding part 16 is inserted in the radial inside of the depressed part 20 across the entire length in the axial direction, which is the direction of protrusion, and the outer circumference of the protruding part 16 is surrounded by the second elastic body 14 across the entire length in the axial direction.

Figure 3:
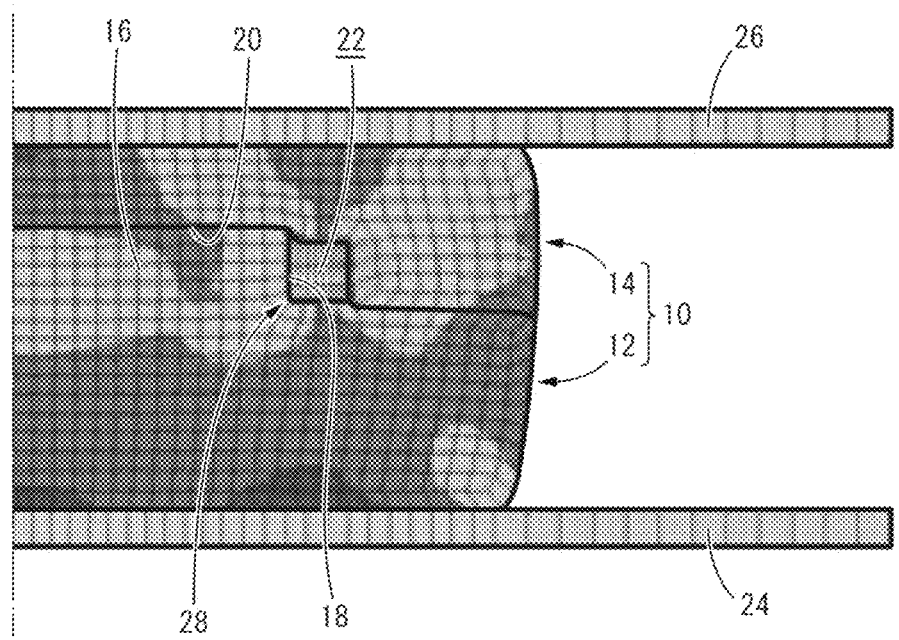
FIG. 3 is a view showing a simulation result of strain distribution when the door stopper shown in FIG. 1 is compressed in the axial direction.

The door stopper 10 having such a structure is mounted on a vehicle by, for example, the first elastic body 12 being attached to a body frame 24 of the vehicle as shown in FIG. 1. Then, as shown in FIG. 3, by a door 26 that serves as a vehicle-use door being closed, the second elastic body 14, which is the protruding distal end side, is pressed against the door 26 and compressed in the axial direction between the body frame 24 and the door 26. With such a state, the door stopper 10 is configured to be arranged between the body frame 24 and the door 26. With the door stopper 10 mounted on the vehicle, the first elastic body 12 constitutes the proximal end of the door stopper 10 attached to the body frame 24, and the second elastic body 14 constitutes the distal end of the door stopper 10 which is the door 26 side.

Besides, when a load in the axial direction is input to the door stopper 10 by the door 26 being closed or the like, the door stopper 10 is compressed in the axial direction between the body frame 24 and the door 26, and the protruding part 16 is pushed in the axial direction to the proximal end side.

Here, to the wall of the gap 22 constituted by the recessed part 18, which is provided to the proximal end of the protruding part 16, there is set a strain concentration part 28 where stress concentratedly acts and the strain of the first elastic body 12 locally increases during load input in the axial direction. That is, the wall of the recessed part 18 is provided with a corner including the line of intersection of the outer circumferential surface of the protruding part 16 and the upper face of the first elastic body 12 on the radial outside of the protruding part 16. When the door stopper 10 is compressed in the axial direction, the stress is concentrated on this corner and the strain increases. Therefore, in the present practical embodiment, the corner serves as the strain concentration part 28. Moreover, since the recessed part 18 constitutes the gap 22 without being filled with the second elastic body 14, elastic deformation of the first elastic body 12 in the recessed part 18 is allowed by the gap 22, so that the strain is concentratedly added. As a result, the door stopper 10 is able to realize excellent vibration damping performance based on a large attenuating action with respect to the load input in the axial direction, owing to the increased strain generated in the portion that constitutes the wall of the gap 22 in the first elastic body 12 which is formed of a high attenuation material.

The strain concentration part 28 provided to the recessed part 18 of the present practical embodiment has a bent shape having a certain degree of angle (approximately 90° in the present practical embodiment), and with respect to the load input in the axial direction, the first elastic body 12 deforms so as to decrease the opening angle made by the inner faces of the recessed part 18 at the strain concentration part 28. Specifically, the first elastic body 12 deforms such that the outer circumferential surface of the protruding part 16, which is one of the inner faces of the recessed part 18 sandwiching the strain concentration part 28 in between, approaches the upper face of the first elastic body 12 on the radial outside of the protruding part 16, which is the other of the inner faces. Accordingly, during the deformation of the first elastic body 12 due to the load input in the axial direction, the gap 22 formed by the recessed part 18 deforms so that the space substantially reduces. The change in the opening angle made by the inner faces of the recessed part 18 as described above is configured to be the largest particularly in the strain concentration part 28.

Besides, in the present practical embodiment, the recessed part 18 has a groove shape that is continuous about the entire circumference, and the entire recessed part 18 constitutes the gap 22. Thus, concentration of strain in the first elastic body 12 will be achieved about the entire circumference, thereby realizing more excellent vibration damping performance.

Furthermore, the recessed part 18 opens toward the radial outside that is the lateral side with respect to the axial direction, which is the direction of load input. Thus, when the protruding part 16 is compressed in the axial direction by the load input and the protruding part 16 deforms so as to expand in the axis-perpendicular direction, the first elastic body 12 deforms so that the opening of the recessed part 18 is narrowed. By so doing, stress concentration due to buckling occurs in the strain concentration part 28 set to the wall of the recessed part 18, and the strain locally increases, thereby exhibiting excellent vibration attenuating performance.

Additionally, since the strain concentration part 28 set to the corner of the recessed part 18 of the present practical embodiment has a valley-like bent shape, the strain is more readily concentrated on the strain concentration part 28, so that vibration damping effect will be more efficiently attained owing to further concentration of the strain.

Meanwhile, the fact that in the strain concentration part 28 set to the corner of the wall of the recessed part 18, the strain increases during the load input in the axial direction is also demonstrated by the analysis results obtained by a finite element method of a simulation shown in FIG. 3. Although the outputted analysis results are displayed in color, they are shown in gray scale in FIG. 3 (FIGS. 6, 21 and 22), and it is difficult to distinguish the difference in stress level, thus a brief explanation will be given below. Specifically, in FIG. 3, the strain distribution of the door stopper 10 in a state where the door stopper 10 is compressed in the axial direction between the body frame 24 and the door 26 is shown by color coding. According to this, the strain is large at the outer circumference of the protruding part 16 including the proximal end (the lower end) around the corner of the wall of the recessed part 18 (the lower-end outer peripheral edge of the protruding part 16). Thus, it was confirmed that the strain during the load input in the axial direction increased at the strain concentration part 28 set to the wall of the gap 22. Note that in FIG. 3, only the right half of the door stopper 10 is illustrated. Besides, in FIG. 3, the strain is color-coded according to the magnitude of the strain by the hue which is closer to blue as the strain is smaller and is closer to red as the strain is larger.

By mounting the door stopper 10 having excellent attenuating capability as described above onto the door portion of the vehicle to use, with the door 26 closed, the vibration (rattling) of the door 26 is reduced by the door stopper 10. Moreover, by the door 26 being supported by the body frame 24 via the door stopper 10, the closed door 26 also functions as a reinforcing material for the body frame 24, and the rigidity of the body frame 24 substantially increases, thereby achieving improvement in the vibration state, enhancement of the traveling performance, and the like of the vehicle. In particular, the door stopper 10 has a structure in which the first elastic body 12 and the second elastic body 14 are overlapped and arranged in series in the axial direction, which is the direction of load input. Besides, the distal end of the door stopper 10 is constituted by the soft second elastic body 14. Thus, the door 26 is flexibly supported by the door stopper 10, so as to advantageously realize vibration damping of the door 26, integral support thereof with respect to the body frame 24, and the like.

Further, when closing the door 26 from the opened state, an impact load in the axial direction is input to the door stopper 10, and the door stopper 10 is compressed more significantly in the axial direction. In this case, the amount of displacement of the door 26 is limited by the harder first elastic body 12, so as to prevent the door 26 from striking the body frame 24. Moreover, the first elastic body 12 is formed of a high attenuation material having a large loss tangent (tan δ), and the kinetic energy of the door 26 input to the door stopper 10 is efficiently reduced by the attenuating action of the first elastic body 12. Therefore, the door 26 is supported at an appropriate position with respect to the body frame 24, and the door 26 is held in a closed state.

The vibration damping effect of the door stopper 10 is not only exhibited with respect to a vibration load which is input in a state where the door 26 is closed and the door stopper 10 is compressed in the axial direction between the body frame 24 and the door 26, but also effectively exhibited with respect to an impact load which is input to the door stopper 10 when the door 26 is closed from the opened state.

Besides, in the door stopper 10 of the present practical embodiment, the first elastic body 12 and the second elastic body 14 are in contact with each other in the axial direction not only at the distal end face of the protruding part 16 and the upper floor face of the depressed part 20 but also at the radial outside of the protruding part 16 and the depressed part 20. This makes it possible to obtain more excellent load bearing capability in the axial direction.

Additionally, in the door stopper 10 of the present practical embodiment, the second elastic body 14, which is softer and superior in cushioning action, is formed of a material having a small compression set. Thus, even if relatively large compressive strain occurs in the axial direction with the door 26 continuously closed, the change in the axial dimension of the door stopper 10 due to the compression set of the second elastic body 14 is reduced. On the other hand, regarding the first elastic body 12 having a larger compression set than that of the second elastic body 14, the axial dimension is larger than that of the second elastic body 14, and the first elastic body 12 is harder than the second elastic body 14. Since the compressive strain generated in the axial direction in the closed state of the door 26 is relatively small, the change in the axial dimension of the door stopper 10 due to the compression set of the first elastic body 12 is also reduced. Therefore, even if the closed state of the door 26 in which the door stopper 10 is compressed between the body frame 24 and the door 26 is maintained for a long time, the compression sets of the first elastic body 12 and the second elastic body 14 will be suppressed, thereby preventing the axial dimension of the door stopper 10 from changing over time. Thus, the vibration damping ability and the supporting ability of the door 26 owing to the door stopper 10 will be maintained for a long time, and the door 26 can be positioned at an appropriate position with respect to the body frame 24 during closing operation of the door 26.

Figure 4:
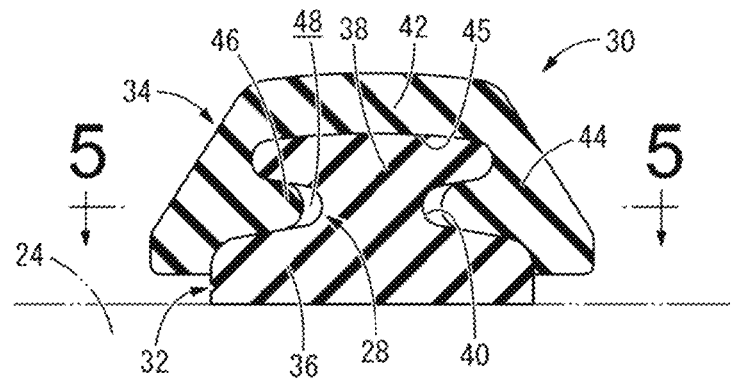
FIG. 4 is a cross-sectional view showing a door stopper as a second practical embodiment of the present invention, taken along line 4-4 of FIG. 5.
Figure 5:
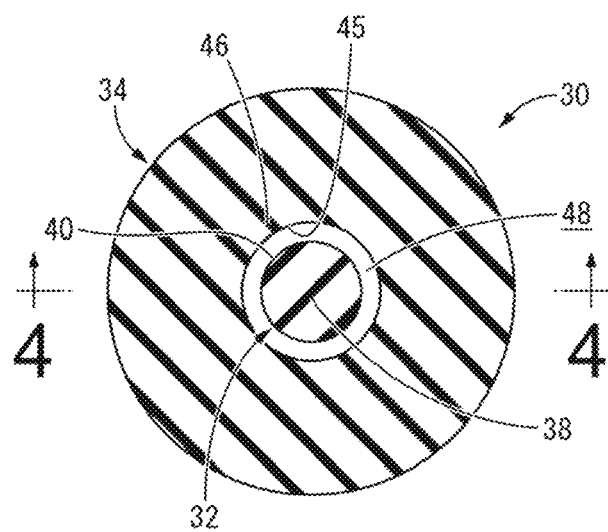
FIG. 5 is a cross-sectional view taken along line 5-5 of FIG. 4.

FIGS. 4 and 5 depict a door stopper 30 for a vehicle as a second practical embodiment of a composite vibration-damping body constructed according to the present invention. As shown in FIG. 4, the door stopper 30 has a structure in which a first elastic body 32 and a second elastic body 34 are overlapped with each other in the axial direction. In the following description, components and parts that are substantially identical with those in the preceding first practical embodiment will be assigned like symbols and not described in any detail.

Described more specifically, the first elastic body 32 has a shape like a weight overall, and integrally includes a shaft-shaped part 36 having a large-diameter, generally cylindrical shape and a protruding part 38 protruding upward from the shaft-shaped part 36. Besides, in the lower portion of the protruding part 38 of the first elastic body 32, there is formed a groove-shaped recessed part 40 opening onto the outer circumferential surface thereof. Due to the formation of such a recessed part 40, the protruding part 38 of the present practical embodiment is configured such that the upper portion off the recessed part 40 has a larger diameter than that of the lower portion in which the recessed part 40 is formed. The forming material of the first elastic body 32 and the like are similar to those of the first elastic body 12 of the first practical embodiment.

The second elastic body 34 has contours of generally frustoconical shape overall, and integrally includes a series arrangement part 42 arranged in series on the upper side of the first elastic body 32, which is the distal end side thereof, and fixed to the upper face of the protruding part 38 of the first elastic body 32. The second elastic body 34 also integrally includes a parallel arrangement part 44 arranged in parallel so as to surround the outer circumference of the upper portion of the first elastic body 32 and fixed to the outer circumferential surface of the first elastic body 32. The forming material of the second elastic body 34 and the like are similar to those of second elastic body 14 of the first practical embodiment, and the relationship between the hardness of the first elastic body 32 and the hardness of the second elastic body 34 is also similar to that of the first practical embodiment.

Further, in the second elastic body 34, there is formed a depressed part 45 having the series arrangement part 42 as the upper floor and the parallel arrangement part 44 as the peripheral wall so as to open downward. Moreover, there is provided a convex part 46 protruding from the radially inner surface of the depressed part 45 of the second elastic body 34. The convex part 46 is continuously provided about the entire circumference with a cross-sectional shape roughly corresponding to the recessed part 40 of the first elastic body 32, and the protruding height dimension of the convex part 46 is smaller than the depth dimension of the recessed part 40.

The second elastic body 34 is fixed so as to cover the upper surface of the first elastic body 32, and the protruding part 38 of the first elastic body 32 is inserted in the depressed part 45 of the second elastic body 34. The protruding part 38 is inserted in the radial inside of the depressed part 45 across the entire length in the axial direction, which is the direction of protrusion, and the outer circumference of the protruding part 38 is surrounded by the second elastic body 34 across the entire length in the axial direction.

In this way, by the upper surface of the first elastic body 32 being covered with the second elastic body 34, and by the protruding part 38 being inserted in the depressed part 45, the recessed part 40 of the first elastic body 32 opens onto the overlapped face with the second elastic body 34, while the convex part 46 of the second elastic body 34 protrudes on the overlapped face with the first elastic body 32, and the convex part 46 is inserted in the recessed part 40.

Furthermore, the convex part 46 inserted in the recessed part 40 is overlapped and fixed in a state of contact with the upper and lower wall faces of the recessed part 40, and is disposed away from the radially inner floor face of the recessed part 40 to the radial outside. Accordingly, there is formed a gap 48 extending in the circumferential direction between the distal end face of the convex part 46 and the radially inner floor face of the recessed part 40. The gap 48 of the present practical embodiment has an annular shape, similarly to the gap 22 of the first practical embodiment, so as to be a closed space isolated from the outside.

The second elastic body 34 is overlapped and fixed in a state of contact with a portion of the protruding part 38 of the first elastic body 32 which is off the radially inner floor face of the recessed part 40, and is also fixed to the upper end of the shaft-shaped part 36 of the first elastic body 32 and protrudes to the radial outside of the shaft-shaped part 36. Besides, in the door stopper 30 of the present practical embodiment, the first elastic body 32 and the series arrangement part 42 of the second elastic body 34 are arranged in series in the axial direction, while the first elastic body 32 and the parallel arrangement part 44 of the second elastic body 34 are coaxially arranged in parallel.

As shown in FIG. 4, the door stopper 30 having such a structure is attached to the vehicle by the lower end portion of the first elastic body 32 being attached to a body frame 24. The first elastic body 32 is attached to the body frame 24 by, for example, the lower end portion thereof being fixed to the body frame 24 by means such as bonding or welding.

Then, when a load in the axial direction is input to the door stopper 30 mounted on the vehicle, like the door stopper 10 of the first practical embodiment, desired vibration damping performance is exhibited based on the vibration attenuating action of the first elastic body 32.

Specifically, during load input in the axial direction, since the protruding part 38 of the first elastic body 32 is compressed in the axial direction, the recessed part 40 opening to the radial outside at the proximal end of the protruding part 38 deforms such that its upper and lower inner faces approach each other in the vertical direction, and the wall of the recessed part 40 deforms so as to buckle. By so doing, a strain concentration part 28 where strain is concentrated during load input in the axial direction is set to the wall of the recessed part 40, and due to increase in the strain at the strain concentration part 28, excellent vibration attenuating action will be exhibited.

In the wall of the recessed part 40 of the present practical embodiment, there is not formed a clear strain concentration location by the corner as in the first practical embodiment. In such a case, the strain concentration part 28 is set, for example, to a portion that is an inflection point of the wall face of the recessed part 40 when viewed in vertical cross section shown in FIG. 4. That is, in the present practical embodiment, the strain concentration part 28 is set to the radially inner floor portion of the recessed part 40 at a position where the depth dimension of the recessed part 40 is the largest.

The strain concentration part 28 provided to the recessed part 40 of the present practical embodiment has a curved shape having a certain degree of angle, and with respect to the load input in the axial direction, the first elastic body 32 deforms so as to decrease the opening angle made by the inner faces of the recessed part 40 at the strain concentration part 28. Specifically, in the present practical embodiment, during load input in the axial direction, the first elastic body 32 deforms such that the inner faces on both the upper and lower sides of the recessed part 40 sandwiching the strain concentration part 28 in between approach each other. Accordingly, during the deformation of the first elastic body 32 due to the load input in the axial direction, the gap 48 formed by the recessed part 40 deforms so that the space substantially reduces. The change in the opening angle made by the inner faces of the recessed part 40 as described above is configured to be the largest particularly in the strain concentration part 28.

Besides, the floor face of the recessed part 40 and the protruding distal end face of the convex part 46 are remote from each other, and the gap 48 is provided between the recessed part 40 and the convex part 46. Thus, the wall face of the recessed part 40 is allowed to deform without being restrained by the convex part 46 at least at the floor part. Therefore, in the strain concentration part 28 set to the floor of the recessed part 40, the strain with respect to the load input in the axial direction increases, thereby more advantageously obtaining the desired attenuating action.

Further, in the present practical embodiment, the convex part 46 of the second elastic body 34 is inserted in the recessed part 40 of the first elastic body 32, and the upper and lower faces of the proximal end portion of the convex part 46 are overlapped in a state of contact with the wall face of the recessed part 40. With this arrangement, excessive deformation of the wall of the recessed part 40 is prevented by the compression spring of the convex part 46. Therefore, during the load input in the axial direction, it is possible to prevent the wall of the recessed part 40 from being damaged by excessive deformation while effectively obtaining the attenuating action owing to the deformation of the recessed part 40.

Additionally, during the load input in the axial direction, the upper wall of the recessed part 40 is vertically compressed between the series arrangement part 42 of the second elastic body 34 and the convex part 46, and the convex part 46 is vertically compressed by the wall of the recessed part 40. Thus, it can also be expected to obtain a further attenuating action.

Figure 6:
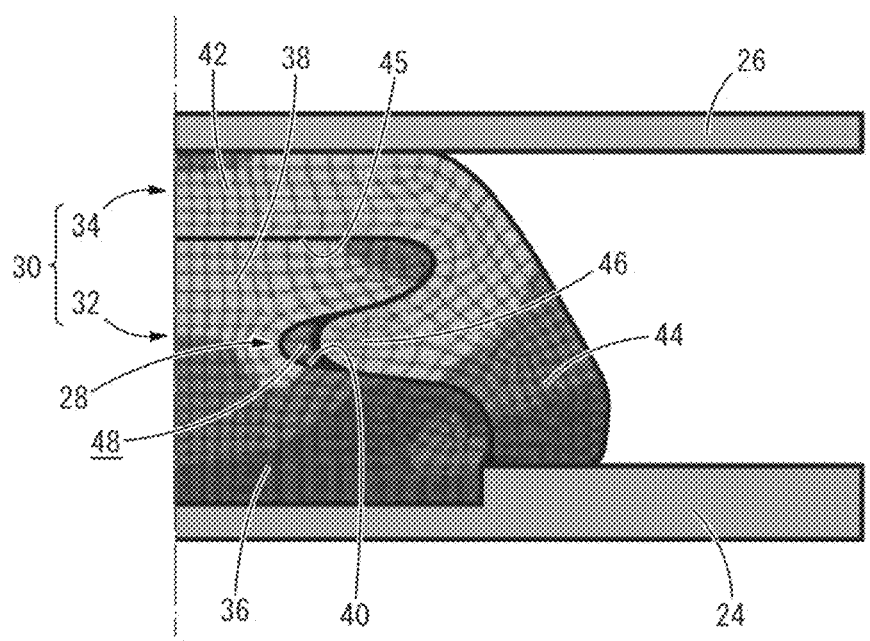
FIG. 6 is a view showing a simulation result of strain distribution when the door stopper shown in FIG. 4 is compressed in the axial direction.

The fact that in the strain concentration part 28 set to the corner of the wall of the recessed part 40, the strain increases during the load input in the axial direction is also demonstrated by the analysis results obtained by a finite element method of a simulation shown in FIG. 6. That is, according to the strain distribution of FIG. 6, the strain is large at the wall of the deepest part of the recessed part 40, and it was confirmed that the strain during the load input in the axial direction increased at the strain concentration part 28 set to the wall of the gap 48. Note that FIG. 6 illustrates only the right half of the door stopper 30 similarly to FIG. 3 of the preceding practical embodiment, and the strain is shown by the hue which is closer to blue as the strain is smaller and is closer to red as the strain is larger. Besides, in the simulation whose analysis results are shown in FIG. 6, the body frame 24 is provided with a step, and the body frame 24 is in contact not only with the lower face of the shaft-shaped part 36 of the first elastic body 32 but also with the lower face of the parallel arrangement part 44 of the second elastic body 34.

Further, when the door 26 closes from the opened state, an impact load in the axial direction is input to the door stopper 30. Then, as in the first practical embodiment, displacement of the door 26 relative to the body frame 24 is restrained by the first elastic body 32 at an appropriate position, and the kinetic energy of the door 26 is reduced by the attenuating action owing to elastic deformation of the first elastic body 32.

Moreover, when a large load in the compression direction is input to the door stopper 30 when closing the door 26 or the like, in addition to the series arrangement part 42 of the second elastic body 34 and the first elastic body 32, the parallel arrangement part 44 of the second elastic body 34 will be pinched and compressed between the body frame 24 and the door 26. By so doing, a harder spring can be obtained in the door stopper 30, and the displacement of the door 26 with respect to the body frame 24 will be effectively limited. That is, in the door stopper 30 of the present practical embodiment, the spring characteristics change in a stepwise manner according to the magnitude of the input, and when the input is large, stopper action for limiting the relative displacement between the body frame 24 and the door 26 can be obtained more advantageously. As will be understood from FIG. 4, the series arrangement part 42 and the parallel arrangement part 44 are arranged such that the series arrangement part 42 is compressed prior to the parallel arrangement part 44 during closing operation of the door 26.

Figure 7:
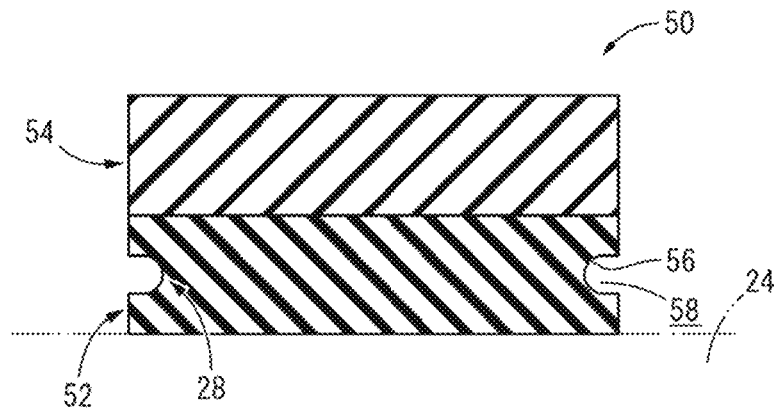
FIG. 7 is a cross-sectional view showing a door stopper as a third practical embodiment of the present invention.

FIG. 7 depicts a door stopper 50 for a vehicle as a third practical embodiment of a composite vibration-damping body constructed according to the present invention. The door stopper 50 of the present practical embodiment comprises a first elastic body 52 and a second elastic body 54.

Described more specifically, the first elastic body 52 is formed of rubber, synthetic resin or the like, and has a generally cylindrical shape. The first elastic body 52 includes a groove-shaped recessed part 56 that opens onto the outer circumferential surface thereof and continues about the entire circumference. Meanwhile, the second elastic body 54 is formed of rubber, synthetic resin or the like, and has a generally cylindrical shape having the same diameter as that of the first elastic body 52.

The first elastic body 52 and the second elastic body 54 are arranged in series in the axial direction, and are fixed with the second elastic body 54 overlapped on the upper surface of the first elastic body 52. In the present practical embodiment, the recessed part 56 opening onto the outer circumferential surface of the first elastic body 52 is exposed without being covered by the second elastic body 54, and constitutes a gap 58.

The door stopper 50 of the present practical embodiment is mounted on a vehicle by the first elastic body 52 being fixed to the body frame 24. While not shown in the drawing, similarly to the preceding practical embodiments, by closing a door (not shown), the door will be in contact with the second elastic body 54 from the upper side.

With such a door stopper 50 as well, similarly to the preceding practical embodiments, vibration damping effect based on attenuating action of the first elastic body 52 is effectively exerted with respect to load input in the axial direction. In particular, when the first elastic body 52 is compressed in the axial direction, the strain is concentrated and increased at a strain concentration part 28 set to the wall face of the recessed part 56, thereby effectively exhibiting attenuating action of the first elastic body 52. Moreover, since the recessed part 56 is exposed to the external space, elastic deformation of the first elastic body 52 will take place without being limited in the recessed part 56. This makes it possible to largely obtain the strain at the strain concentration part 28 of the recessed part 56.

As shown in the present practical embodiment, the recessed part of the first elastic body is not necessarily be covered by the second elastic body. Furthermore, the gap constituted by the recessed part may also be an open space exposed to the outside.

Figure 8:
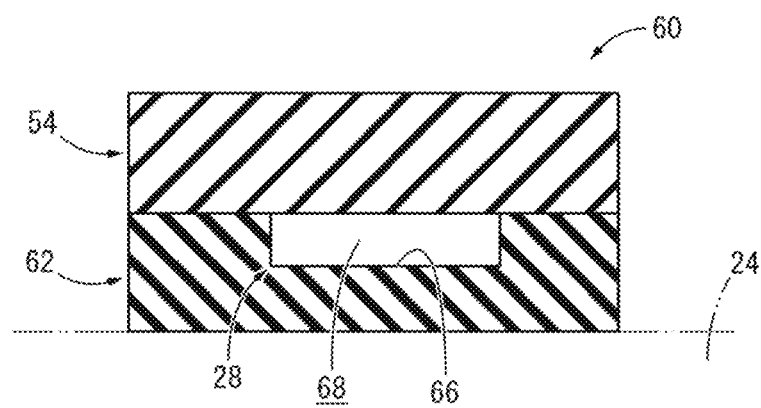
FIG. 8 is a cross-sectional view showing a door stopper as a fourth practical embodiment of the present invention.

FIG. 8 depicts a door stopper 60 for a vehicle as a fourth practical embodiment of a composite vibration-damping body constructed according to the present invention. The door stopper 60 of the present practical embodiment comprises a first elastic body 62 and a second elastic body 54.

The first elastic body 62 is formed of a material having higher rigidity than that of the second elastic body 54, and has a generally cylindrical shape overall. The first elastic body 62 includes a circular recessed part 66 opening in the central portion of the upper surface thereof. Meanwhile, the second elastic body 54 has a cylindrical shape roughly corresponding to the shape of the first elastic body 62.

Then, the second elastic body 54 is overlapped on the upper surface of the first elastic body 62, and the first elastic body 62 and the second elastic body 54 are fixed to each other, whereby the door stopper 60 is provided. Besides, the opening of the recessed part 66 of the first elastic body 62 is covered by the second elastic body 54, and there is formed a circular gap 68 constituted by the recessed part 66 between the overlapped faces of the first elastic body 62 and the second elastic body 54. In the present practical embodiment, a corner of the lower-end outer peripheral edge of the wall of the recessed part 66 constitutes a strain concentration part 28.

By the first elastic body 62 being attached to an automotive body frame 24, for example, the door stopper 60 having such a structure is arranged between the body frame 24 and a door (not shown). With this arrangement, the body frame 24 and the door are held positioned at an appropriate relative position and are connected in a vibration damped manner, while an impact when the door is closed from the opened state will be ameliorated.

Further, in the door stopper 60 constructed according to the present practical embodiment, the strain concentration part 28 where a large strain is generated with respect to load input in the axial direction is set to the wall of the gap 68 constituted by the recessed part 66 of the first elastic body 62. Owing to the large strain concentrated in the strain concentration part 28, the energy attenuating action of the first elastic body will be advantageously exhibited, thereby attaining excellent vibration damping performance.

As shown in the present practical embodiment, in the case where the recessed part constituting the strain concentration part is provided to the overlapped portion of the first elastic body and the second elastic body, the recessed part is not necessarily limited to the one provided to the corner of the proximal end of the protruding part.

Figure 9:
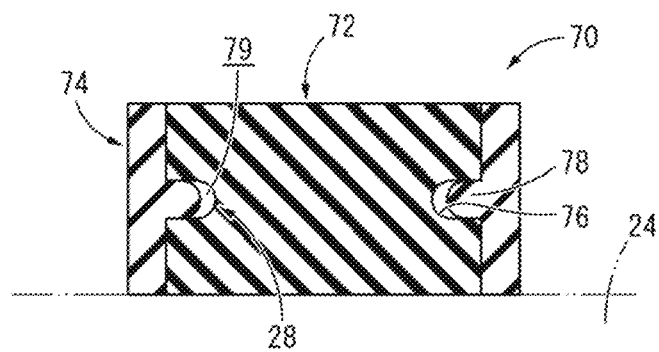
FIG. 9 is a cross-sectional view showing a door stopper as a fifth practical embodiment of the present invention.

FIG. 9 depicts a door stopper 70 for a vehicle as a fifth practical embodiment of the composite vibration-damping body constructed according to the present invention. The door stopper 70 of the present practical embodiment comprises a first elastic body 72 and a second elastic body 74.

Described more specifically, the first elastic body 72 is formed of rubber, synthetic resin, or the like and has a generally cylindrical shape. The first elastic body 72 includes a groove-shaped recessed part 76 that opens onto the outer circumferential surface thereof and continues about the entire circumference.

The second elastic body 74 is formed of rubber, synthetic resin, or the like and has a generally cylindrical shape. The inside diameter dimension of the second elastic body 74 is equal to the outside diameter dimension of the first elastic body 72. Moreover, a convex part 78 is integrally formed with the radially inner surface of the second elastic body 74 so as to protrude to the radial inside. The protruding height dimension of the convex part 78 is smaller than the depth dimension of the recessed part 76 of the first elastic body 72. The convex part 78 of the present practical embodiment is continuously provided with a generally constant cross-sectional shape about the entire circumference.

The first elastic body 72 and the second elastic body 74 are coaxially arranged in parallel with the first elastic body 72 inserted in the inner hole of the second elastic body 74, and the outer circumferential surface of the first elastic body 72 and the radially inner surface of the second elastic body 74 are fixed to each other. That is, the door stopper 70 of the present practical embodiment is configured such that its radially inner portion is constituted by the first elastic body 72, and its outer circumferential portion is constituted by the second elastic body 74.

Furthermore, the convex part 78 of the second elastic body 74 is inserted in the recessed part 76 of the first elastic body 72, and the proximal end portion of the convex part 78 is overlapped in a state of contact with the upper and lower wall faces of the recessed part 76. In addition, the distal end face of the convex part 78 is disposed away from the radially inner floor face of the recessed part 76 to the radial outside, so that there is formed a gap 79 between the distal end face of the convex part 78 and the radially inner floor face of the recessed part 76. Note that the proximal end portion of the convex part 78 and the upper and lower wall faces of the recessed part 76 may be fixed to each other or may alternatively be in contact with each other in a non-adhesive manner.

The door stopper 70 of the present practical embodiment is mounted on a vehicle by the first elastic body 72 being fixed to a body frame 24. While not shown in the drawing, similarly to the preceding practical embodiments, by closing a door (not shown), the door will be in contact with the second elastic body 74 from the upper side.

With such a door stopper 70 as well, similarly to the preceding practical embodiments, vibration damping effect based on attenuating action of the first elastic body 72 is effectively exerted with respect to load input in the axial direction. In particular, when the first elastic body 72 is compressed in the axial direction, the strain is concentrated and increased at a strain concentration part 28 set to the radially inner floor portion of the recessed part 76, thereby effectively exhibiting attenuating action of the first elastic body 72. Moreover, since the strain concentration part 28 is set to the wall of the gap 79 of the first elastic body 72, elastic deformation of the first elastic body 72 will take place at the strain concentration part 28 without being limited by the second elastic body 74 or the like. This makes it possible to largely obtain the strain at the strain concentration part 28.

As shown in the present practical embodiment, the first elastic body and the second elastic body are not necessarily limited to the placement arranged in series in the direction of load input, but may be, for example, placed in parallel so as to be coaxially arranged.

Figure 10:
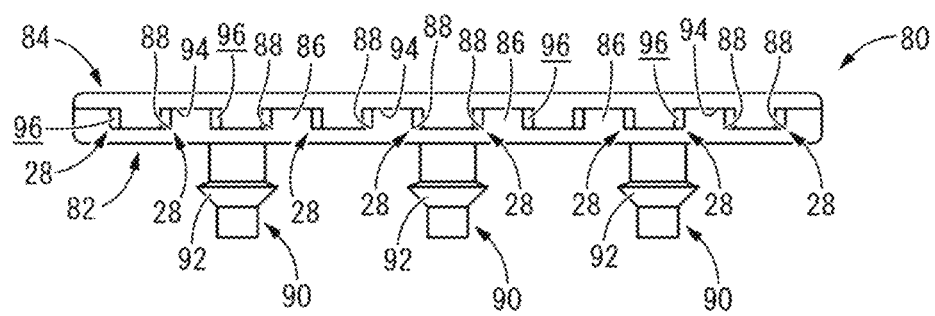
FIG. 10 is a front view showing a composite vibration-damping body in the form of a stopper rubber as a sixth practical embodiment of the present invention.
Figure 11:
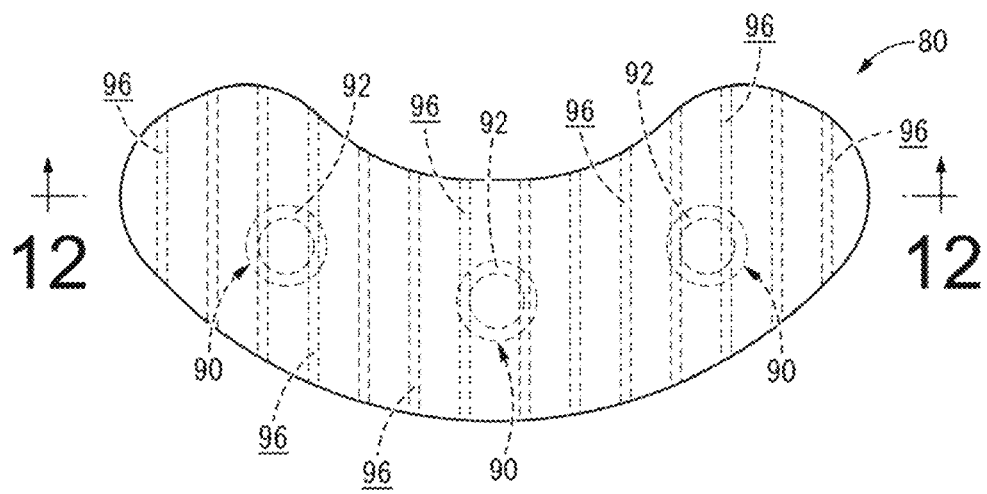
FIG. 11 is a top plan view of the stopper rubber shown in FIG. 10.
Figure 12:
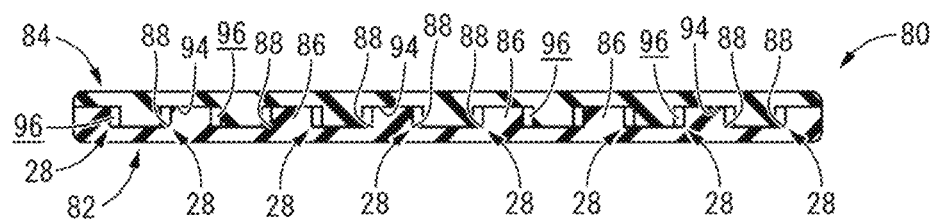
FIG. 12 is a cross-sectional view taken along line 12-12 of FIG. 11.

FIGS. 10 to 12 depict a stopper rubber 80 for a vibration damping device as a sixth practical embodiment of the composite vibration-damping body constructed according to the present invention. As shown in FIGS. 10 and 12, the stopper rubber 80 according to the present practical embodiment comprises a first elastic body 82 and a second elastic body 84. In the present practical embodiment, as a general rule, the vertical direction refers to the vertical direction in FIG. 10, the left-right direction refers to the left-right direction in FIG. 10, and the front-back direction refers to the vertical direction in FIG. 11.

Described more specifically, the first elastic body 82 is formed of rubber, synthetic resin, or the like, and has a generally plate shape which curves in a plan view as shown in FIG. 11. Furthermore, as shown in FIGS. 10 and 12, the first elastic body 82 includes protruding parts 86 which protrude on the upper surface and extend straightly in the front-back direction, and recessed parts 88 opening to the left-right lateral side on the left-right opposite sides of the proximal end of the protruding part 86. In the present practical embodiment, a plurality of the protruding parts 86 are arranged in parallel at a predetermined distance in the left-right direction, and the recessed parts 88 are formed on the left-right opposite sides of each protruding part 86. With respect to the protruding parts 86 provided to the left-right opposite ends, the recessed part 88 is formed only on the left-right inner sides of the proximal end of the protruding part 86.

Furthermore, the first elastic body 82 integrally includes three attachment projections 90, 90, 90 projecting downward. The attachment projection 90 has a small-diameter, generally cylindrical shape overall, and integrally includes a locking part 92 projecting radially outward at its axially middle portion. The attachment projection 90 is made smaller in diameter on the distal side of the locking part 92 than on the proximal side thereof, so as to be easy to insert into a locking hole 110 of an inner bracket 106 described later.

The second elastic body 84 is formed of rubber, synthetic resin, or the like, and has a plate shape of roughly the same planar shape as the first elastic body 82. Besides, the second elastic body 84 includes a groove-shaped depressed part 94 opening onto the lower surface and extending in the front-back direction. The depressed part 94 extends straightly with a generally constant rectangular cross section, and in comparison with the protruding part 86 of the first elastic body 82, its left-right dimension is made larger while its vertical dimension is made equal or slightly smaller. Moreover, in the present practical embodiment, a plurality of the depressed parts 94 corresponding to the protruding parts 86 are arranged in parallel at a predetermined distance in the left-right direction.

The first elastic body 82 and the second elastic body 84 are overlapped in the vertical direction and fixed to each other. Besides, the protruding part 86 of the first elastic body 82 is inserted in the depressed part 94 of the second elastic body 84, and the distal end face of the protruding part 86 and the upper floor face of the depressed part 94 are overlapped in a state of contact and fixed to each other.

Here, the left-right side surfaces of the protruding part 86 of the first elastic body 82 and the left-right side wall faces of the depressed part 94 of the second elastic body 84 are remote from each other in the left-right direction. Accordingly, between the protruding part 86 and the left-right side wall faces of the depressed part 94, there is formed a gap 96 extending straightly in the front-back direction. The gap 96 is provided on the left-right opposite sides of the protruding part 86, and a part of the gap 96 is constituted by the recessed part 88 of the first elastic body 82. Note that the gap 96 of the present practical embodiment is constituted by an open space whose front-back opposite ends are exposed the external space.

Figure 13:
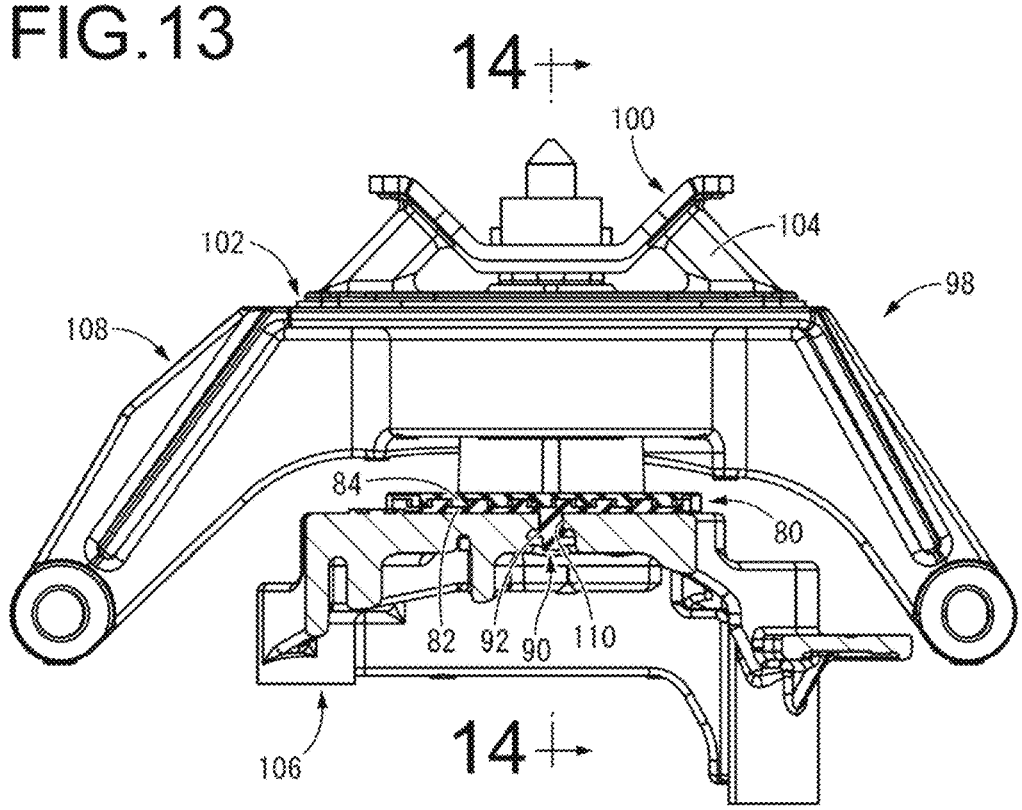
FIG. 13 is a partial cross-sectional view showing an example in which the stopper rubber shown in FIG. 10 is applied to a vibration damping device, taken along line 13-13 of FIG. 14.
Figure 14:
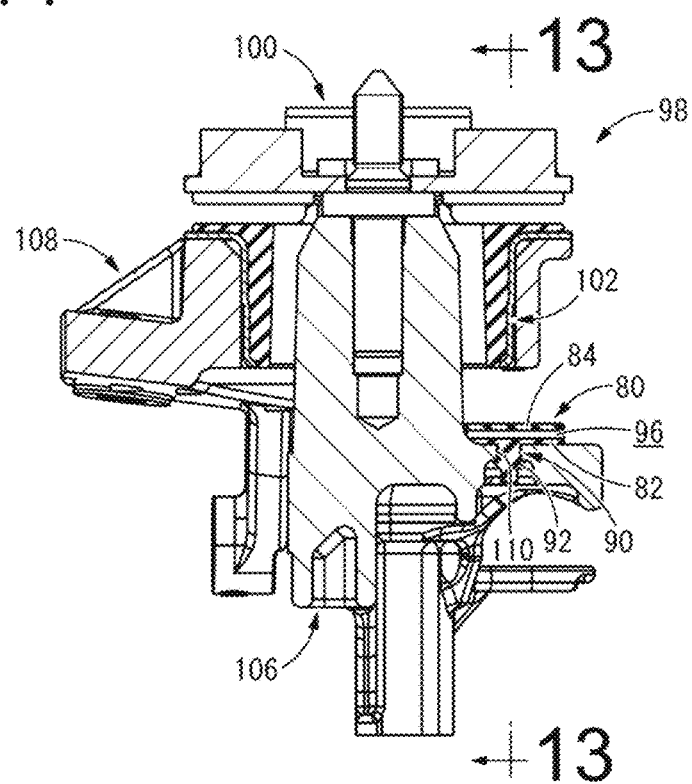
FIG. 14 is a cross-sectional view taken along line 14-14 of FIG. 13.

As shown in FIGS. 13 and 14, the stopper rubber 80 having such a structure is used by being attached to a vibration damping device 98 such as an engine mount. The vibration damping device 98 has a structure in which a first mounting member 100 and a tubular second mounting member 102 are elastically connected by a main rubber elastic body 104. Besides, an inner bracket 106 is attached to the first mounting member 100, while an outer bracket 108 is externally attached to the second mounting member 102.

Moreover, the inner bracket 106 is inserted through the second mounting member 102 and the outer bracket 108, and extends as far as the lower side of the outer bracket 108. Accordingly, the inner bracket 106 and the outer bracket 108 are opposed to each other at a predetermined distance in the vertical direction. By the inner bracket 106 and the outer bracket 108 being attached respectively to one and the other of components that make up a vibration transmission system such as a power unit and a vehicle body, for example, the components that make up the vibration transmission system are configured to be connected in a vibration damping manner via the vibration damping device 98.

Then, the stopper rubber 80 is overlapped on the surface of the inner bracket 106 that is opposed to the outer bracket 108. By the attachment projections 90 of the stopper rubber 80 being inserted through the locking holes 110 formed in the inner bracket 106, and by the locking parts 92 being locked to the opening peripheral edges of the locking holes 110, the stopper rubber 80 is attached to the inner bracket 106.

With the vibration damping device 98 mounted on the vehicle, when a large impact load is input in the vertical direction, which is the axial direction, and the first mounting member 100 and the second mounting member 102 are largely displaced away from each other in the vertical direction, the opposed faces of the inner bracket 106 and the outer bracket 108 approach each other in the vertical direction and come into contact with each other via the stopper rubber 80. By so doing, the vibration damping device 98 is provided with a rebound stopper for limiting an amount of displacement between the first mounting member 100 attached to the inner bracket 106 and the second mounting member 102 attached to the outer bracket 108 away from each other in the vertical direction.

Further, by the stopper rubber 80 being pinched between the inner bracket 106 and the outer bracket 108 in the vertical direction, the protruding part 86 of the first elastic body 82 is compressed in the vertical direction. As a result, strain is increased in a strain concentration part 28 set to the wall of the gap 96 formed by the recessed part 88 of the first elastic body 82, thereby advantageously obtaining attenuating action of the first elastic body 82. The strain concentration part 28 of the present practical embodiment is set to the corner of the proximal end of the protruding part 86.

Moreover, the strain concentration part 28 faces the gap 96, and the deformation of the strain concentration part 28 is not limited by the second elastic body 84. Therefore, a large strain can be generated at the strain concentration part 28, thereby making it possible to obtain a larger attenuating action with respect to input in the vertical direction.

In addition, in the present practical embodiment, by providing a plurality of the strain concentration parts 28, the strain of the first elastic body 82 with respect to the input will be dispersed to some extent, thereby obtaining effective attenuating action while improving durability.

Figure 15:
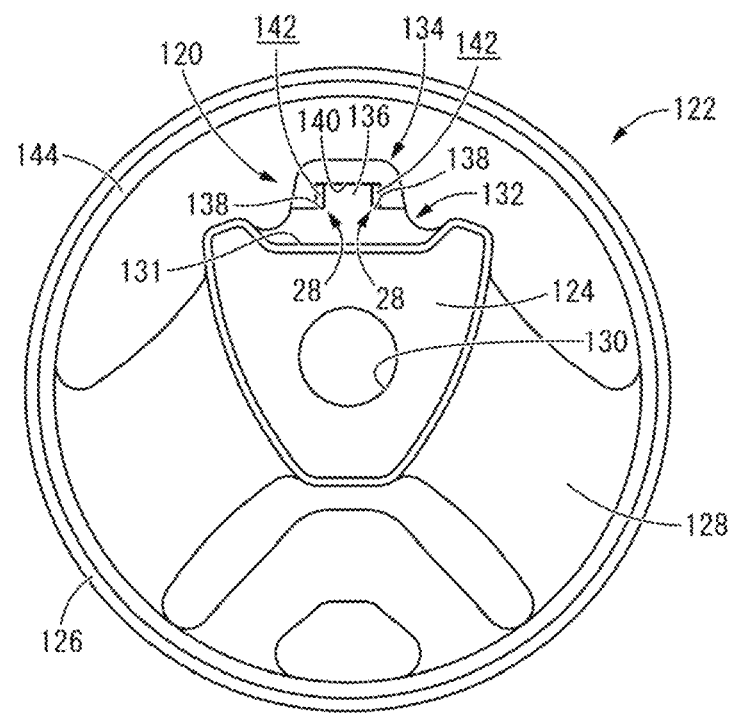
FIG. 15 is a front view of a tubular vibration-damping device provided with a stopper rubber as a seventh practical embodiment of the present invention.

FIG. 15 depicts a tubular vibration-damping device 122 including a stopper rubber 120 which is a seventh practical embodiment of the composite vibration-damping body according to the present invention. The tubular vibration-damping device 122 has a structure in which an inner shaft member 124 and an outer tube member 126 are elastically connected by a main rubber elastic body 128. In the description of the present practical embodiment, as a general rule, the axial direction refers to the direction perpendicular to the plane of the page in FIG. 15, the vertical direction refers to the vertical direction in FIG. 15, and the left-right direction refers to the left-right direction in FIG. 15.

Described more specifically, the inner shaft member 124 is a high rigidity component made of metal, synthetic resin or the like, and extends in the axial direction with a cross-sectional shape that narrows in the left-right direction as it goes downward. Besides, a bolt hole 130 penetrates the central portion of the inner shaft member 124 in the axial direction. Furthermore, at the upper end of the inner shaft member 124, there is formed a concavity 131 opening upward. On the other hand, the outer tube member 126 is a high rigidity component made of metal, synthetic resin or the like, and has a thin-walled, large-diameter, generally round tubular shape.

The inner shaft member 124 is disposed on the radial inside of the outer tube member 126, and the inner shaft member 124 and the outer tube member 126 are elastically connected by the main rubber elastic body 128. The main rubber elastic body 128 extends from the left-right side surfaces of the inner shaft member 124 so as to slope downward to the left-right outside, and the left-right opposite ends of the main rubber elastic body 128 are fixed to the radially inner surface of the outer tube member 126.

Here, the stopper rubber 120 is disposed on the upper side of the inner shaft member 124. The stopper rubber 120 has a structure in which a first elastic body 132 and a second elastic body 134 are overlapped with each other in the vertical direction.

The first elastic body 132 is formed integrally with or separately from the main rubber elastic body 128 and is fixed to the inner face of the concavity 131 opening onto the upper surface of the inner shaft member 124. Further, the first elastic body 132 is provided with a protruding part 136 protruding upward from the left-right central portion thereof, and at the proximal end of the protruding part 136, there is formed a recessed part 138 opening to the lateral side and above. The protruding part 136 of the present practical embodiment extends straightly in the axial direction with a generally constant rectangular cross section.

The second elastic body 134 is a separate component from the first elastic body 132, and is made of rubber, resin elastomer, or the like that has lower attenuation than that of the first elastic body 132. Besides, the second elastic body 134 is provided with a groove-shaped depressed part 140 opening onto the lower surface and extending straightly in the axial direction. In preferred practice, the second elastic body 134 is formed of a material softer than the first elastic body 132.

Then, the second elastic body 134 is overlapped and fixed to the upper surface of the first elastic body 132 fixed to the inner shaft member 124, so as to constitute the stopper rubber 120 of the present practical embodiment. Further, the protruding part 136 of the first elastic body 132 is inserted in the depressed part 140 of the second elastic body 134, and the distal end face of the protruding part 136 and the upper floor face of the depressed part 140 are overlapped in a state of contact with each other. Also, the left-right side surfaces of the protruding part 136 and the left-right side wall faces of the depressed part 140 are opposed so as to be remote from each other in the left-right direction. Accordingly, there is formed a gap 142 between the left-right side surfaces of the protruding part 136 and the left-right side wall faces of the depressed part 140 so as to penetrate in the axial direction. A part of the gap 142 is formed by the recessed part 138 of the first elastic body 132, and at a portion of the wall of the gap 142 formed by the corner of the recessed part 138, there is provided a strain concentration part 28 subjected to an increased strain during load input described later.

The stopper rubber 120 is disposed below the radially inner surface of the outer tube member 126 at a predetermined distance. The radially inner surface of the outer tube member 126 is covered by a rubber sheath layer 144 integrally formed with the main rubber elastic body 128, and the stopper rubber 120 is remote downward from the radially inner surface of the rubber sheath layer 144.

In the tubular vibration-damping device 122 having such a structure, when a large impact load in the vertical direction is input across the inner shaft member 124 and the outer tube member 126, and the inner shaft member 124 is displaced upward relative to the outer tube member 126, the inner shaft member 124 and the outer tube member 126 come into contact with each other via the stopper rubber 120. By so doing, an upper stopper for limiting an amount of relative displacement between the inner shaft member 124 and the outer tube member 126 is constituted by including the stopper rubber 120.

Here, in the stopper rubber 120, the strain is concentrated on the strain concentration part 28, so that attenuating action of the first elastic body 132 is largely exhibited, thereby achieving excellent cushioning action. By so doing, in the upper stopper, an impact, striking noise or the like due to the contact between the inner shaft member 124 and the outer tube member 126 will be reduced based on energy attenuating action of the stopper rubber 120.

Figure 16:
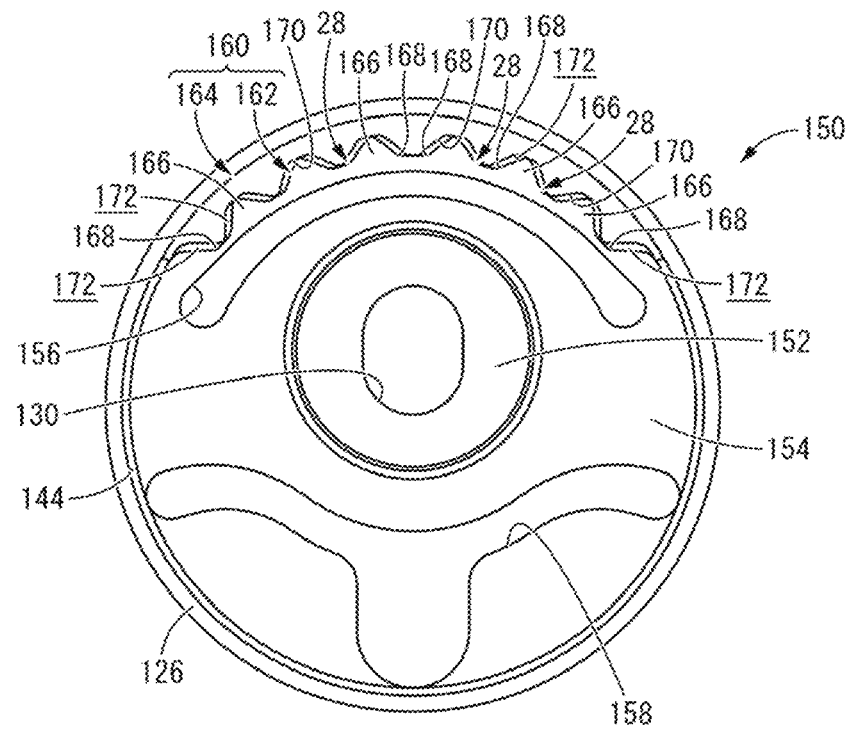
FIG. 16 is a front view of a tubular vibration-damping device provided with a stopper rubber as an eighth practical embodiment of the present invention.
Figure 17:
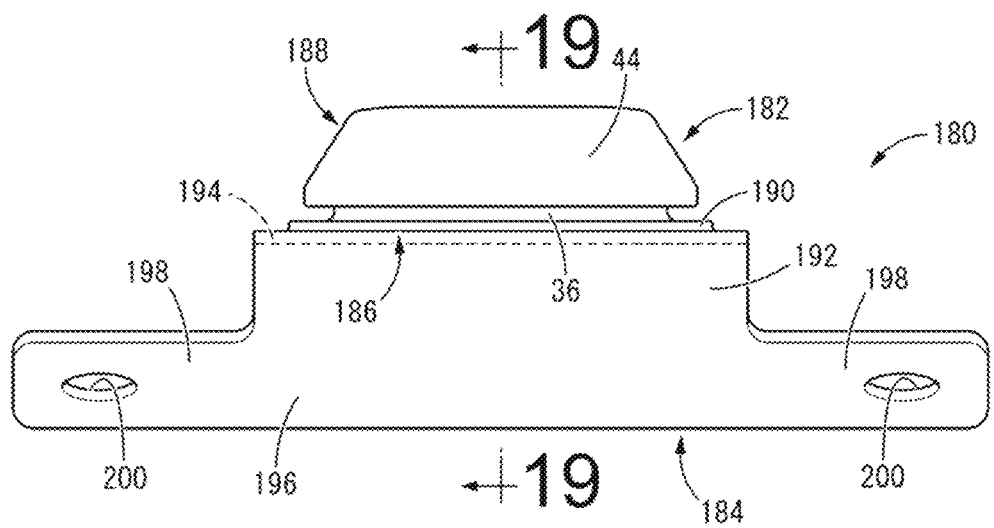
FIG. 17 is a front view showing a metal-spring-equipped composite vibration-damping body in the form of a door stopper as a ninth practical embodiment of the present invention.
Figure 18:
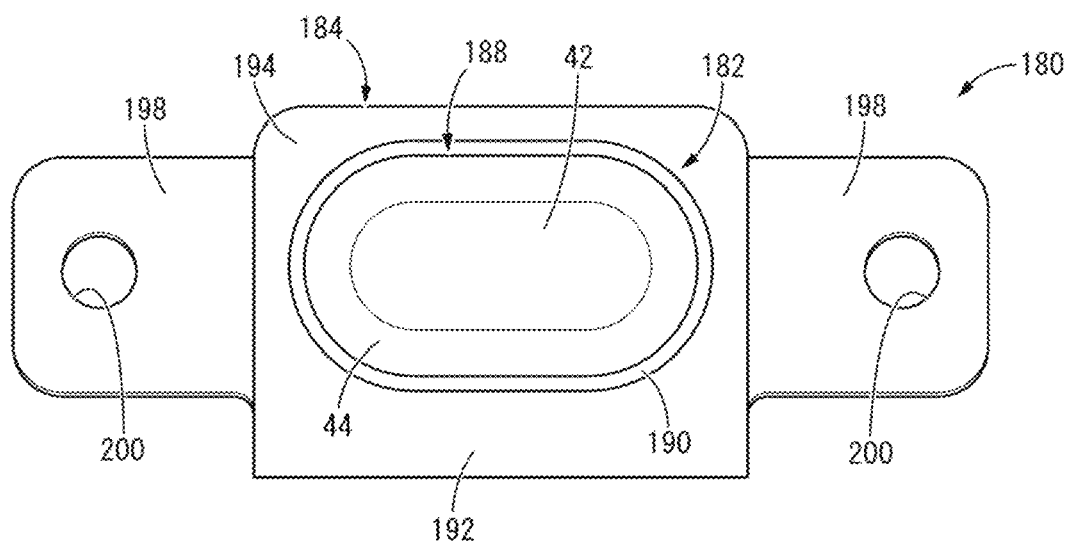
FIG. 18 is a top plan view of the door stopper shown in FIG. 17.

Meanwhile, FIG. 16 depicts a tubular vibration-damping device 150 according to another embodiment in which the present invention is implemented. Specifically, the tubular vibration-damping device 150 has a structure in which an inner shaft member 152 and an outer tube member 126 are elastically connected by a main rubber elastic body 154.

The inner shaft member 152 has a generally cylindrical shape, and is penetrated by a bolt hole 130 in the axial direction. The inner shaft member 152 is disposed so as to be inserted in the outer tube member 126, and the inner shaft member 152 and the outer tube member 126 are elastically connected by the main rubber elastic body 154.

The main rubber elastic body 154 has a generally round tubular shape overall, and its radially inner surface is fixed to the outer circumferential surface of the inner shaft member 152 while its outer circumferential surface is fixed to the radially inner surface of the outer tube member 126. Moreover, upper and lower bore parts 156, 158 are formed respectively on the upper and lower sides of the main rubber elastic body 154 sandwiching the inner shaft member 152 so as to penetrate the main rubber elastic body 154 in the axial direction. The upper bore part 156 extends in the circumferential direction at a position remote from the inner shaft member 152 to the radial outside, and extends for a length less than half the circumference. On the other hand, the lower bore part 158 extends in the left-right direction at a position remote downward from the inner shaft member 152, and its left-right central portion is expanded downward.

Furthermore, a stopper rubber 160, which is an eighth practical embodiment of the composite vibration-damping body according to the present invention, is disposed on the radially outer side of the upper bore part 156. The stopper rubber 160 has a structure in which a first elastic body 162 and a second elastic body 164 are overlapped in the vertical direction.

The first elastic body 162 is integrally formed with the main rubber elastic body 154, and a plurality of protruding parts 166 protruding toward the radial outside are provided side by side in the circumferential direction. The outer peripheral surface of the first elastic body 162 is made wavy by the protruding parts 166. Besides, there are formed groove-shaped recessed parts 168 opening toward the radial outside and extending in the axial direction between the circumferentially adjacent protruding parts 166, 166.

The second elastic body 164 is a separate component from the first elastic body 162 and the main rubber elastic body 154, and has a curved plate shape extending in the circumferential direction overall. The upper surface of the second elastic body 164 has an arcuate curved surface corresponding to the radially inner surface of the outer tube member 126, while the lower surface includes a plurality of depressed parts 170 formed side by side in the circumferential direction. The depressed part 170 has a circumferential width dimension larger than that of the protruding part 166 of the first elastic body 162, while having a depth dimension roughly equal to or slightly smaller than the height dimension of the protruding part 166.

Then, the second elastic body 164 is inserted between the first elastic body 162 and the outer tube member 126, and the outer peripheral surface of the second elastic body 164 is fixed to the radially inner surface of the outer tube member 126. This configuration provides the stopper rubber 160 in which the first elastic body 162 and the second elastic body 164 are overlapped in the radial direction.

Furthermore, the protruding part 166 of the first elastic body 162 is inserted into the depressed part 170 of the second elastic body 164, so that the side surface of the protruding part 166 and the side inner surface of the depressed part 170 are situated in opposition so as to be remote from each other. Accordingly, there is formed a gap 172 that extends in the axial direction between the protruding part 166 and the wall of the depressed part 170, including a recessed part 168. Moreover, in the wall of the gap 172 formed by the first elastic body 162, there is set a strain concentration part 28 subjected to an increased strain during load input in the vertical direction described later. The strain concentration part 28 of the present practical embodiment is set to a corner provided in the wall of the recessed part 168 at the proximal end of the protruding part 166.

In the tubular vibration-damping device 150 having such a structure, when a large impact load in the vertical direction is input across the inner shaft member 152 and the outer tube member 126, and the inner shaft member 152 is displaced upward relative to the outer tube member 126, the inner shaft member 152 and the outer tube member 126 come into contact with each other via the stopper rubber 160. By so doing, an upper stopper for limiting an amount of relative displacement between the inner shaft member 152 and the outer tube member 126 is constituted by including the stopper rubber 160.

In the stopper rubber 160 constructed according to the present practical embodiment as well, the strain is concentrated on the strain concentration part 28, so that attenuating action of the first elastic body 162 is largely exhibited. Thus, in the upper stopper, an impact, striking noise or the like due to indirect contact between the inner shaft member 152 and the outer tube member 126 will be reduced based on energy attenuating action of the stopper rubber 160.

The tubular vibration-damping devices 122, 150 shown in FIGS. 15 and 16 may be provided with brackets or the like as necessary on the inner shaft members 124, 152 and the outer tube members 126, 126. As a specific example, the tubular vibration-damping devices 122, 150 can be used by being fitted into a tubular part provided to a rod end of a torque rod, and the like.

FIGS. 17 to 20 depict a door stopper 180 for a vehicle according to a ninth practical embodiment of the present invention. The door stopper 180, which is a metal-spring-equipped composite vibration-damping body, has a structure in which a composite vibration-damping body 182 is fixed to a metal spring 184.

The composite vibration-damping body 182 comprises a first elastic body 186 and a second elastic body 188, and has roughly the same structure as the door stopper 30 shown in the second practical embodiment overall. However, in the present practical embodiment, the first elastic body 186 has a roughly oval pillar shape, and the second elastic body 188 has a roughly oval frustoconical shape. That is, the composite vibration-damping body 182 has a structure in which the door stopper 30 is elongated in one diametrical direction, and has a roughly oval shape as viewed in the vertical direction. Besides, a fixing part 190 extending to the radial outside is integrally formed with the lower end of the first elastic body 186.

Figure 19:
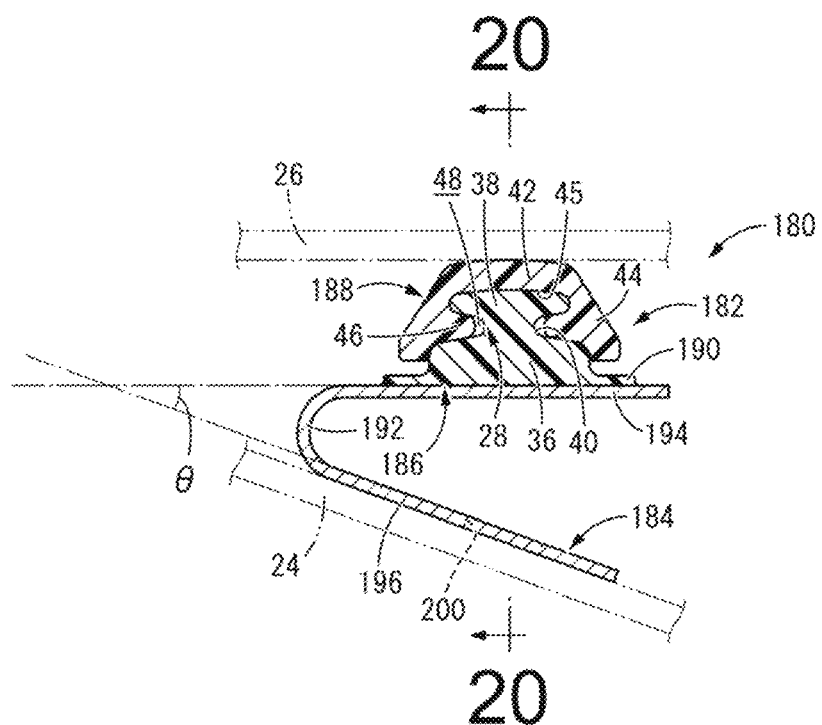
FIG. 19 is a cross-sectional view taken along line 19-19 of FIG. 17.
Figure 20:
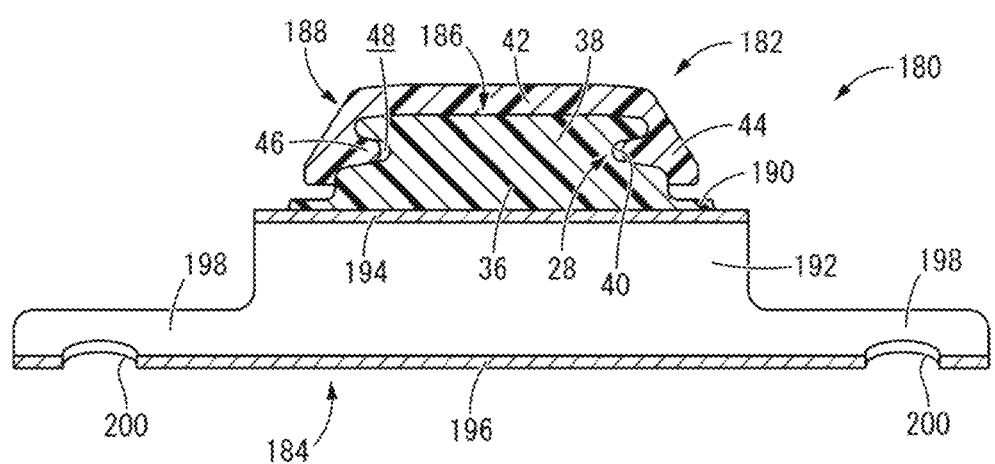
FIG. 20 is a cross-sectional view taken along the line 20-20 of FIG. 19.

The metal spring 184 is a plate spring made of metal having a structure in which a blank metal plate is folded at a bent part 192. As shown in FIG. 19, a first plate-shaped part 194 having a roughly flat-plate shape is provided to one side of the bent part 192 having a curved plate shape, and a second plate-shaped part 196 having a roughly flat-plate shape is provided to the other side thereof. Further, the second plate-shaped part 196 integrally includes attachment parts 198, 198 extending outward to both the left and right sides from the end opposite to the bent part 192. Each of the attachment parts 198, 198 is penetrated by a bolt hole 200.

The first plate-shaped part 194 and the second plate-shaped part 196, which are disposed to vertically face each other, displace relative to each other accompanied by a relative change of angle due to elastic deformation of the bent part 192, whereby the metal spring 184 is configured to function as a spring. In the present practical embodiment, the first plate-shaped part 194 and the second plate-shaped part 196 are arranged so as to be relatively inclined by a predetermined inclination angle $\theta$ satisfying $0°<\theta<90°$, and the metal spring 184 deforms so that $\theta$ approaches $0°$ due to load input. In the metal spring 184 in the initial state where no load is input, the relative inclination angle $\theta$ of the first plate-shaped part 194 and the second plate-shaped part 196 is preferably $30°$ or less.

The first elastic body 186 of the composite vibration-damping body 182 is fixed to the upper surface of the first plate-shaped part 194 of the metal spring 184, and the metal spring 184 is provided in series below the composite vibration-damping body 182. In the present practical embodiment, since the fixing part 190 is integrally formed with the lower end of the first elastic body 186, a large area for fixing the first elastic body 186 to the metal spring 184 is obtained, thereby improving adherence strength. The fixing method of the first elastic body 186 and the metal spring 184 is not particularly limited, but various publicly known methods such as bonding and welding may be adopted. Moreover, in the present practical embodiment, after the composite vibration-damping body 182 is formed by combining the first elastic body 186 and the second elastic body 188, the first elastic body 186 is fixed to the metal spring 184. However, it would also be acceptable that, for example, after the first elastic body 186 is fixed to the metal spring 184 in its single state, the second elastic body 188 is combined with the first elastic body 186, so as to form the composite vibration-damping body 182 on the metal spring 184.

As shown in FIG. 19, the door stopper 180 according to the present practical embodiment having such a structure is configured such that the second plate-shaped part 196 of the metal spring 184 is attached to a vehicle body frame 24, which is a component to be damped, by bolts (not shown) being inserted through the bolt holes 200, 200 of the metal spring 184. By so doing, the door stopper 180 is disposed between the body frame 24, which is a constituent component of a vibration transmission system and a door 26 serving as a vehicle-use door. When the door 26 is closed, the door 26 comes into contact with the composite vibration-damping body 182, and the door stopper 180 will be in a compressed state between the body frame 24 and the door 26 with the door 26 closed.

When the door 26 is closed with the door stopper 180 attached to the vehicle, due to the door 26 coming into contact with the composite vibration-damping body 182, a load in the roughly vertical direction is input to the composite vibration-damping body 182, thereby exhibiting vibration damping effect based on vibration attenuating action of the first elastic body 186. In particular, the attenuating action will be effectively attained by the first elastic body 186 which is formed of a high attenuation material and in which a strain concentration part 28 is set to the wall of a recessed part 40.

Figure 21:
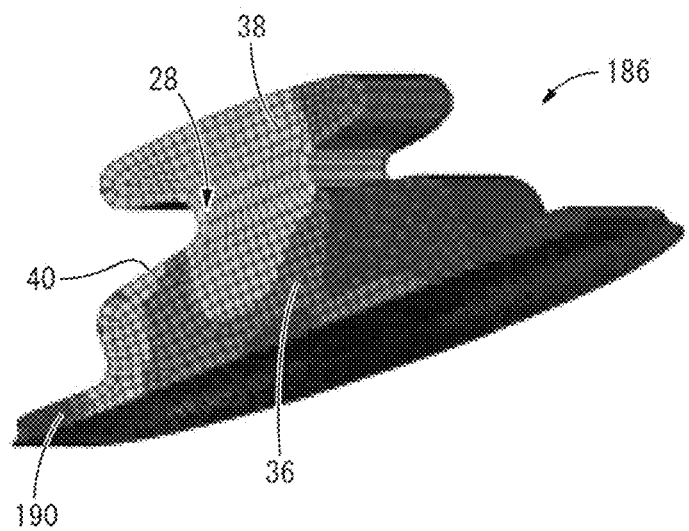
FIG. 21 is a view showing a simulation result of strain distribution in a first elastic body when the door stopper shown in FIG. 17 is compressed.

Meanwhile, the fact that the strain increases in the strain concentration part 28 set to the corner of the wall of the recessed part 40 during the load input in the vertical direction is also demonstrated by the result of a simulation shown in FIG. 21. That is, according to the simulation result of FIG. 21, it was confirmed that the strain was increased at the wall of the deepest part of the recessed part 40 on the left side in the drawing. Note that in FIG. 21 and in FIG. 22 described later that illustrates the simulation result, the magnitude of the distortion is indicated by the hue, which is closer to blue as the strain is smaller and is closer to red as the strain is larger. Also note that the strain distributions in FIGS. 21 and 22 show the simulation results in the case where the door stopper was compressed to the extent such that the relative inclination angle of the first plate-shaped part 194 and the second plate-shaped part 196 in the metal spring 184 was reduced by 4°.

Besides, since the input direction of the main load with respect to the door stopper 180 is roughly the vertical direction, the composite vibration-damping body 182 and the metal spring 184 are arranged in series in the direction of load input. With this arrangement, during the load input, the metal spring 184 undergoes elastic deformation accompanied by change of angle of the first plate-shaped part 194 and the second plate-shaped part 196. Therefore, for example, when the door 26 is kept closed and the stationary load is continuously acted on the door stopper 180, by the metal spring 184 preferentially undergoing elastic deformation, permanent set of the composite vibration-damping body 182 will be prevented. This may achieve improvement in durability of the composite vibration-damping body 182, stabilization in vibration damping characteristics thereof, and the like.

Figure 22:
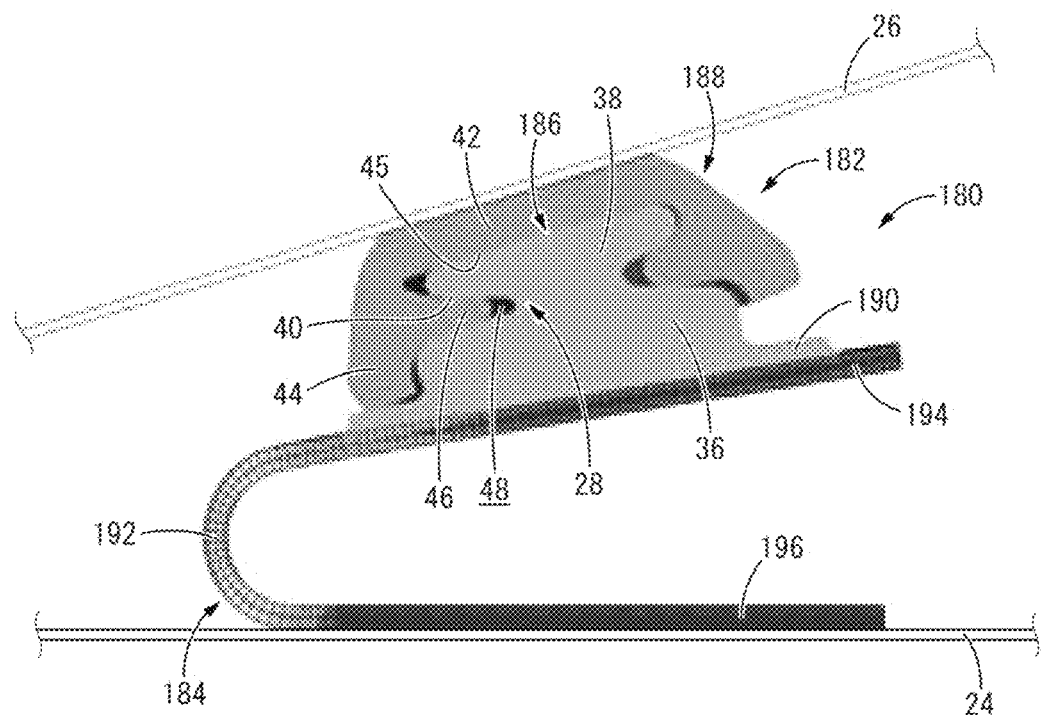
FIG. 22 is a view showing a simulation result of strain distribution in a metal spring when the door stopper shown in FIG. 17 is compressed.

In addition, it is also demonstrated by the simulation result shown in FIG. 22 that the metal spring 184 undergoes elastic deformation during load input. That is, according to FIG. 22, it was found that the strain of the metal spring 184 was concentrated on the bent part 192 during load input, and the metal spring 184 underwent elastic deformation at the bent part 192. In this way, in the door stopper 180 of the present practical embodiment, the load is supported not only by the composite vibration-damping body 182 but also by the metal spring 184.

Moreover, the spring constant of the metal spring 184 linearly increases as the amount of deformation increases. Therefore, during input of a large load that acts when the door 26 is closed or the like, elastic deformation of the composite vibration-damping body 182 occurs from the state where the metal spring 184 has deformed to some extent, thereby effectively attaining vibration damping effect of the composite vibration-damping body 182.

Furthermore, the change of angle of the first plate-shaped part 194 and the second plate-shaped part 196 in the metal spring 184 occurs around a position that is different from the hinge (not shown) connecting the body frame 24 and the door 26. Thus, as the door 26 moves around the hinge from the state of contact with the composite vibration-damping body 182 to the direction of closing, the position of contact of the door 26 with respect to the composite vibration-damping body 182 and the direction of acting of the load changes. Then, for example, by the door 26 coming into contact with the corner of the upper end of the composite vibration-damping body 182, the strain of the composite vibration-damping body 182 due to the load exerted from the door 26 is more readily concentrated on the strain concentration part 28, thereby more effectively achieving the attenuating action of the first elastic body 186.

Particularly in the present practical embodiment, the metal spring 184 undergoes elastic deformation and the direction of load input changes. Thus, when the load is input to the outer peripheral corner of the distal end of the composite vibration-damping body 182, the outer peripheral end of the upper part of the protruding part 38 is pushed downward, and deformation such as buckling is more likely to occur on the inner face of the recessed part 40 opening onto the outer peripheral surface of the protruding part 38. As a result, in the strain concentration part 28 set to the inner face of the recessed part 40, a larger strain will be generated partially in the circumferential direction, thereby more largely exhibiting the attenuating action of the first elastic body 186.

In addition, since the metal spring 184 is provided to the composite vibration-damping body 182 in series in the direction of load input, the size of the door stopper 180 in the direction of load input can also be easily adjusted by the metal spring 184. That is, when trying to adjust the size of the door stopper 180 by the first and second elastic bodies 186, 188, the spring characteristics, attenuating capability, compression set, and the like are all greatly influenced, and a high degree of adjustment is necessary for realizing the required characteristics. However, with the metal springs 184, it is not necessary to consider attenuation and permanent set, so that the characteristics are readily adjusted at the time of resizing. Therefore, by adjusting the size and shape of the metal spring 184, it is easy to adjust the size of the door stopper 180 while realizing the required characteristics. Thus, even when the clearance between the body frame 24 and the door 26 is large, if the first and second elastic bodies 186, 188 are supported by the metal spring 184 at a position close to the door 26, it is possible to effectively obtain contact reaction force or the like exerted on the door 26 from the door stopper 180 with the door 26 closed. This also makes it possible to adopt a common composite vibration-damping body 182 for door structures having different clearances.

Figure 23:
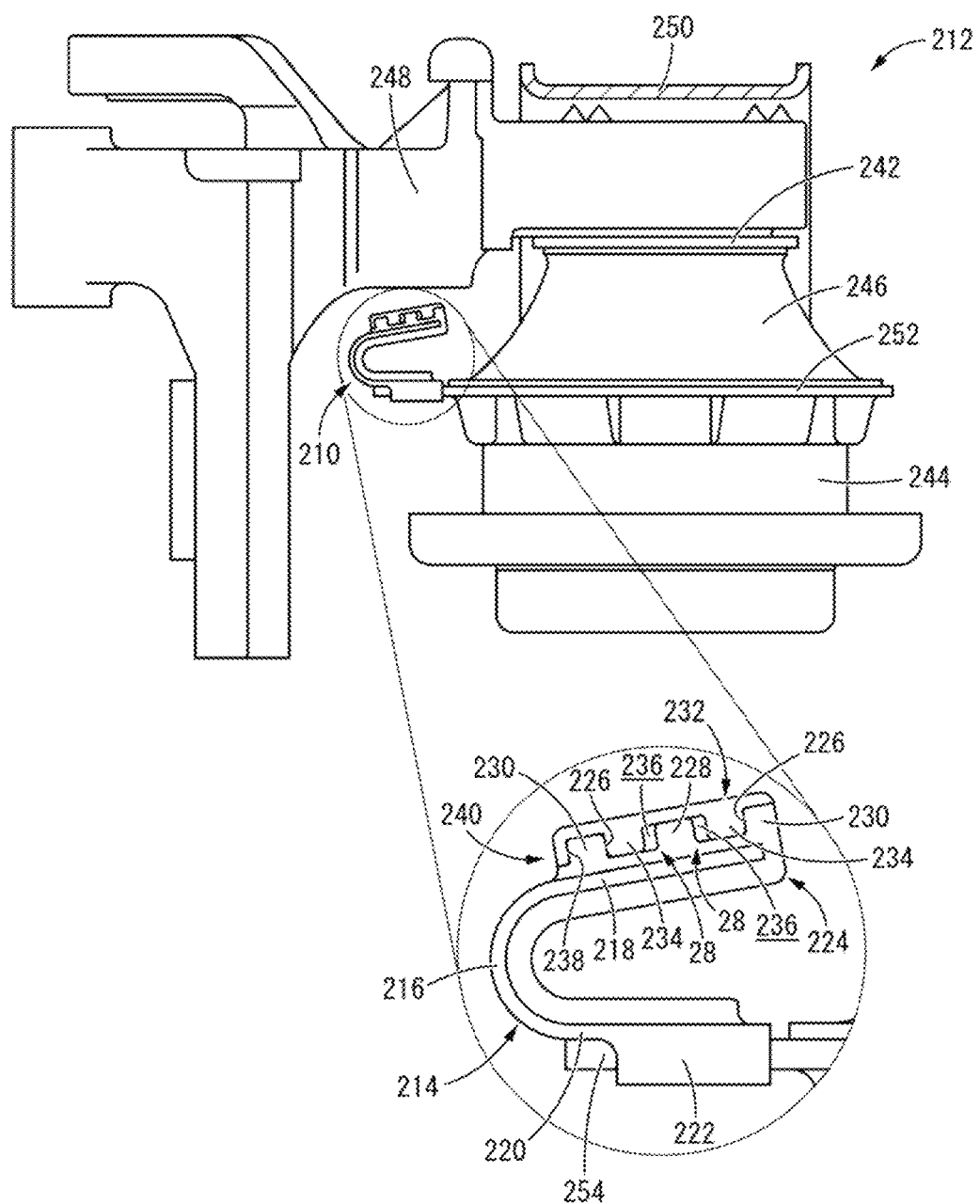
FIG. 23 is a front view of a vibration damping device to which a metal-spring-equipped composite vibration-damping body in the form of a stopper member as a tenth practical embodiment of the present invention is attached.

FIG. 23 depicts a stopper member 210 as the tenth practical embodiment according to the present invention in a state of being attached to a vibration damping device 212. In the following description, as a general rule, the vertical direction refers to the vertical direction in FIG. 23, which is the input direction of the main load.

The stopper member 210 includes a metal spring 214. The metal spring 214 is a plate spring having a structure in which a blank metal plate is folded at a bent part 216. A first plate-shaped part 218 is provided to one side of the bent part 216 having a curved plate shape, and a second plate-shaped part 220 is provided to the other side thereof.

The first plate-shaped part 218 has a roughly flat-plate shape and extends from the upper end of the bent part 216 toward the radially inner side of the vibration damping device 212, while sloping upward as it goes to the radially inner side of the vibration damping device 212. The second plate-shaped part 220 has a roughly flat-plate shape and extends from the lower end of the bent part 216 toward the radially inner side of the vibration damping device 212, while spreading roughly orthogonally to the vertical direction. Moreover, the second plate-shaped part 220 integrally includes a clinch piece 222 serving as an attachment part and protruding to both sides in the width direction (the direction perpendicular to the plane of the page in FIG. 23). By the clinch piece 222 being fastened by clinching to a second mounting member 244, the metal spring 214 is fixed to the second mounting member 244.

Besides, a first elastic body 224 is fixed to the metal spring 214. The first elastic body 224 is fixed to both the upper and lower surfaces of the first plate-shaped part 218 of the metal spring 214, and the first elastic body 224 fixed to the lower surface of the first plate-shaped part 218 extends as far as the bent part 216 and one of the faces of the second plate-shaped part 220 so as to be fixed thereto. Furthermore, the first elastic body 224 fixed to the upper surface of the first plate-shaped part 218 includes two recessed grooves 226, 226 serving as recessed parts that are formed in parallel. The recessed grooves 226, 226 extend straightly in the width direction of the first plate-shaped part 218 (the direction perpendicular to the plane of the page in FIG. 23) while opening onto the upper surface of the first elastic body 224. The cross section of both recessed grooves 226, 226, which is orthogonal to the groove lengthwise direction (the direction perpendicular to the plane of the page in FIG. 23), is generally rectangular. Also, between the recessed grooves 226, 226 of the first elastic body 224, there is provided a protruding part 228 that separates the recessed grooves 226, 226, and the proximal end portion of the protruding part 228, which is a corner of the recessed grooves 226, 226, serves as a strain concentration part 28 in the present practical embodiment. The side walls of the recessed grooves 226, 226 that are opposite to the protruding part 228 constitute mating projections 230, 230 each projecting at substantially identical height to that of the protruding part 228.

In addition, a second elastic body 232 is attached to the first elastic body 224. The second elastic body 232 is a rubber elastic body having a rectangular plate shape and its upper surface is generally flat, while its lower surface including convex parts 234, 234 that correspond to the recessed grooves 226, 226 of the first elastic body 224. The convex parts 234, 234 extend in the width direction of the first plate-shaped part 218 (the direction perpendicular to the plane of the page in FIG. 23), and the distance between the convex parts 234, 234 is greater than the width dimension of the protruding part 228 of the first elastic body 224.

The second elastic body 232 is overlapped from above with respect to the first elastic body 224 fixed to the upper surface of the first plate-shaped part 218 of the metal spring 214, and the convex parts 234, 234 are inserted in the respective recessed grooves 226, 226 of the first elastic body 224. In the present practical embodiment, the opposed side faces of the convex parts 234, 234 are remote from both side faces of the protruding part 228 of the first elastic body 224, and there are formed gaps 236 between the both side faces of the protruding part 228 of the first elastic body 224 and the opposed side faces of the convex parts 234, 234 of the second elastic body 232. With this configuration, a strain concentration part 28 is provided at the wall of the gap 236 of the first elastic body 224. Note that the protruding part 228, which protrudes on the overlapped face of the first elastic body 224 with the second elastic body 232, is inserted between the convex parts 234, 234 of the second elastic body 232, and the protruding distal end face of the protruding part 228 is overlapped with the second elastic body 232.

Meanwhile, the other side faces of the convex parts 234, 234 are pressed against the side faces of the mating projections 230, 230 of the first elastic body 224, and by the convex parts 234, 234 being fitted in the mating projections 230, 230, the first elastic body 224 and the second elastic body 232 are secured. Furthermore, in the present practical embodiment, a mating depression 238 is formed on the outside of the convex part 234, and by the mating projection 230 being fitted in the mating depression 238 as well, the first elastic body 224 and the second elastic body 232 are secured.

A composite vibration-damping body 240 of the present practical embodiment comprise the first elastic body 224 fixed to the upper surface of the first plate-shaped part 218, and the second elastic body 232 attached thereto. Besides, the first elastic body 224 is formed of a material having higher attenuation than that of the second elastic body 232, and is formed of a hard material having a larger spring constant than that of the second elastic body 232. As a forming material of the first elastic body 224 and the second elastic body 232, for example, the material which is similar to that in the first practical embodiment is preferably adopted.

The stopper member 210 having such a structure is attached to the vibration damping device 212. The vibration damping device 212 is a so-called bowl-shaped vibration damping device, and has a structure in which a first mounting member 242 and the second mounting member 244 are elastically connected by a main rubber elastic body 246. Moreover, an inner bracket 248 protruding leftward in FIG. 23 is attached to the first mounting member 242, and a gate-shaped outer bracket 250 is attached to the second mounting member 244. The outer bracket 250 is disposed astride the upper side of the first mounting member 242. Besides, the second mounting member 244 is provided with a flange-shaped part 252 projecting to the radial outside at the upper end portion about the entire circumference, and at a part of the flange-shaped part 252 in the circumferential direction, there is provided a stopper receiver 254 where the projecting dimension to the radial outside is partially enlarged. The specific structure of the vibration damping device 212 is not particularly limited, but various publicly known structures are adoptable. For example, a fluid-filled vibration damping device including a fluid chamber with a non-compressible fluid or liquid sealed inside may be adopted.

Then, the second plate-shaped part 220 of the metal spring 214 constituting the stopper member 210 is overlapped from above on the stopper receiver 254 provided to the second mounting member 244 of the vibration damping device 212. By the clinch piece 222 of the second plate-shaped part 220 being fastened by clinching so as to be wound onto the stopper receiver 254, the metal spring 214 of the stopper member 210 is secured to the second mounting member 244 of the vibration damping device 212. However, the mounting embodiment of the stopper member 210 to the vibration damping device 212 is merely one example, and is not limited in particular. As a specific example, it would also be acceptable that a locking structure is provided between the second plate-shaped part 220 of the metal spring 214 and the stopper receiver 254 of the second mounting member 244, and the metal spring 214 and the second mounting member 244 are secured by locking. In addition, the metal spring 214 and the second mounting member 244 may be fixed by means such as bonding or welding, or the metal spring 214 may be integrally formed by a part of the second mounting member 244. Besides, the stopper member 210 can also be provided on the inner bracket 248 side.

With the stopper member 210 mounted on the vibration damping device 212, the upper end portion of the stopper member 210 constituted by the second elastic body 232 is disposed below the inner bracket 248 at a predetermined distance (stopper clearance). That is, with the stopper member 210 mounted on the vibration damping device 212, the first plate-shaped part 218 and the second plate-shaped part 220 of the metal spring 214 as well as the composite vibration-damping body 240 attached to the metal spring 214 are disposed vertically between the inner bracket 248 and the stopper receiver 254 of the second mounting member 244.

When a vibration in the vertical direction is input across the first mounting member 242 and the second mounting member 244 of the vibration damping device 212, and the first mounting member 242 and the second mounting member 244 largely displace in the direction of getting closer to each other in the vertical direction, the inner bracket 248 attached to the first mounting member 242 comes into contact with the stopper member 210 attached to the second mounting member 244. By so doing, an amount of relative displacement between the first mounting member 242 and the second mounting member 244 in the vertical direction is limited by the contact between the inner bracket 248 and the stopper member 210, so that durability may be improved by prevention of excessive deformation of the main rubber elastic body 246, or the like.

Furthermore, since the first elastic body 224 is formed of a high attenuation material, the stopper member 210 is able to effectively reduce the vibration owing to the attenuating action of the first elastic body 224. Moreover, the strain due to load input is concentrated on the strain concentration parts 28, 28 set to the corners of the recessed grooves 226, 226. Thus, the attenuating action exhibited by the deformation of the first elastic body 224 can be more efficiently obtained.

Besides, the portion of the stopper member 210 configured to directly come into contact with the inner bracket 248 is formed of the second elastic body 232 which is softer than the first elastic body 224. Thus, during the initial contact between the inner bracket 248 and the stopper member 210, it is possible to advantageously obtain cushioning properties and to prevent impact, striking noise, and the like. Moreover, when the inner bracket 248 is pressed more strongly, the first elastic body 224 which is harder than the second elastic body 232 will limit the amount of relative displacement between the first mounting member 242 and the second mounting member 244, thereby effectively attaining desired stopper function.

Additionally, during the initial contact between the inner bracket 248 and the stopper member 210, the spring constant of the metal spring 214 is relatively small, so that the metal spring 214 is elastically deformed by a small force. Thus, cushioning properties can also be advantageously obtained by the elasticity of the metal spring 214. Furthermore, since the spring constant of the metal spring 214 linearly increases as the amount of deformation increases, in the case where the input is large, the amount of relative displacement between the first mounting member 242 and the second mounting member 244 will also be effectively limited by the elasticity of the metal spring 214.

Moreover, regarding the metal spring 214 of its initial shape in which no load is input, the first plate-shaped part 218 supporting the composite vibration-damping body 240 slope upward toward the radially inner side. The upper surface of the composite vibration-damping body 240 also slopes in the same direction as the first plate-shaped part 218. Thus, when the lower surface of the inner bracket 248 spreading roughly orthogonal to the vertical direction comes into contact with the composite vibration-damping body 240, the contact area gradually increases due to the deformation of the metal spring 214. Therefore, while the cushioning action is effectively attained by the small contact area at the initial stage of the contact, when the deformation of the metal spring 214 becomes large, owing to the contact in the large area, it is possible to effectively limit the relative displacement between the first mounting member 242 and the second mounting member 244.

While the present invention has been described in detail hereinabove in terms of the practical embodiments, the invention is not limited by the specific disclosures thereof. For example, the shape, arrangement, number of formations, and the like of the recessed part and the gap may be appropriately changed depending on the required vibration damping characteristics and the like.

In the preceding practical embodiment, shown is an example in which during load input, the first elastic body deforms so as to decrease the opening angle made by the inner faces of the recessed part at the strain concentration part. However, for example, it would also be possible for the first elastic body to deform so as to increase the opening angle made by the inner faces of the recessed part at the strain concentration part, thereby increasing the strain of the first elastic body at the strain concentration part.

Besides, in the first to fourth practical embodiments, illustrated is a structure in which the proximal end of the door stopper is constituted by the first elastic body, while the distal end of the door stopper is constituted by the second elastic body. However, for example, it would also be possible to adopt a structure in which the distal end of the door stopper is constituted by the first elastic body, while the proximal end of the door stopper is constituted by the second elastic body. Furthermore, in the structure as in the fifth practical embodiment in which the first elastic body and the second elastic body are coaxially arranged, it would also be acceptable that the first elastic body has a round tubular shape constituting the outer circumferential portion and includes the recessed part opening toward the radial inside, while the second elastic body has a cylindrical shape constituting the radially inner portion and includes the convex part protruding toward the radial outside.

The door stoppers according to the first to fifth practical embodiments have a generally circular shape viewed in the axial direction. However, the same structure can be obtained, for example, even with an oval shape, a polygonal shape, an irregular shape or the like viewed in the axial direction. Similarly, the shape of the stopper rubber according to the sixth to eighth practical embodiments as viewed in the direction of load input is not particularly limited.

Further, the attachment structure of the door stopper to the body frame according to the first to fifth practical embodiments is not particularly limited. For example, an attaching convex part that protrudes in the axial direction may be provided to the first elastic body, while a concave or a hole may be formed in the body frame. By the attaching convex part of the first elastic body being inserted into the concave or the hole of the body frame, the first elastic body can be attached to the body frame in a non-adhesive way.

In the ninth practical embodiment, the specific structure of the metal spring 184 is not particularly limited. For example, the metal spring 184 may be a non-folded plate spring or the like. Moreover, it is not necessary for the metal spring to include the attachment structure to the body frame 24 or the like (namely, the attachment part 198 provided with the bolt hole 200 in the preceding practical embodiment), but the attachment structure may be provided separately from the metal spring. Furthermore, a metal-spring-equipped composite vibration-damping body can also be constituted by providing a metal spring in series in the direction of load input with respect to the composite vibration-damping body according to the first to fifth practical embodiments.

Additionally, the composite vibration-damping body according to the first to fifth practical embodiments is not necessarily used as a door stopper which is implemented in a door portion of a vehicle only, but may be implemented in, for example, a stopper of a vibration damping device such as an engine mount, a stopper of a door of a building, and the like.

What is claimed is:

1. A composite vibration-damping body comprising a first elastic body and a second elastic body overlapped with each other, wherein
    the first elastic body is formed of a material having higher attenuation than that of the second elastic body,
    the first elastic body includes a recessed part opening onto a surface of the first elastic body, and the recessed part forms a gap, and
    a strain concentration part configured to be subjected to an increased strain during load input is set to a wall of the gap of the first elastic body, wherein
    the recessed part opens onto an overlapped face of the first elastic body with the second elastic body,
    the second elastic body includes a convex part inserted in the recessed part,
    the convex part is partially in contact with an inner face of the recessed part, and
    the gap is formed between the convex part and the inner face of the recessed part.

2. The composite vibration-damping body according to claim 1, wherein the recessed part of the first elastic body has a groove shape.

3. The composite vibration-damping body according to claim 1, wherein the recessed part of the first elastic body opens to a lateral side with respect to a direction of load input.

4. The composite vibration-damping body according to claim 1, wherein the first elastic body and the second elastic body are overlapped in a direction of load input.

5. The composite vibration-damping body according to claim 4, wherein the first elastic body includes a protruding part provided on the overlapped face with the second elastic body and protruding toward the second elastic body, and the recessed part is formed on an outer circumference of the protruding part.

6. The composite vibration-damping body according to claim 5, wherein a protruding distal end face of the protruding part is in contact with the second elastic body, and the first elastic body and the second elastic body are in contact with each other in a direction of protrusion of the protruding part at a position away from the protruding part to a radial outside.

7. The composite vibration-damping body according to claim 1, wherein the second elastic body is formed of a material having a smaller compression set than that of the first elastic body.

8. A metal-spring-equipped composite vibration-damping body comprising:
    the composite vibration-damping body according to claim 1; and
    a metal spring provided to the composite vibration-damping body in series in a direction of load input.

9. The metal-spring-equipped composite vibration-damping body according to claim 8, wherein the metal spring includes an attachment part to a component to be damped.

10. A metal-spring-equipped composite vibration-damping body comprising:
    a composite vibration-damping body comprising a first elastic body and a second elastic body overlapped with each other, wherein
        the first elastic body is formed of a material having higher attenuation than that of the second elastic body,
        the first elastic body includes a recessed part opening onto a surface of the first elastic body, and the recessed part forms a gap, and
        a strain concentration part configured to be subjected to an increased strain during load input is set to a wall of the gap of the first elastic body; and
    a metal spring provided to the composite vibration-damping body in series in a direction of load input, wherein the metal spring comprises a plate spring which is folded at a bent part.

* * * * *